(12) United States Patent
Liang et al.

(10) Patent No.: US 9,371,408 B2
(45) Date of Patent: Jun. 21, 2016

(54) POLYMER AND METHOD FOR USING THE SAME

(75) Inventors: Yangang Liang, Shanghai (CN); Wenqing Peng, Shanghai (CN); Xiaoan Xie, Shanghai (CN); Shengxia Liu, Shanghai (CN); Hongchen Dong, Niskayuna, NY (US); Stephen Robert Vasconcellos, Doylestown, PA (US); Ping Lue, Boothwyn, PA (US); Edward Joseph Urankar, Furlong, PA (US); Larry Neil Lewis, Scotia, NY (US); Robert James Perry, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 207 days.

(21) Appl. No.: 14/131,996

(22) PCT Filed: Jul. 6, 2012

(86) PCT No.: PCT/US2012/045679
§ 371 (c)(1),
(2), (4) Date: Mar. 11, 2014

(87) PCT Pub. No.: WO2013/009594
PCT Pub. Date: Jan. 17, 2013

(65) Prior Publication Data
US 2014/0179854 A1 Jun. 26, 2014

(30) Foreign Application Priority Data
Jul. 12, 2011 (CN) .......................... 2011 1 0193958

(51) Int. Cl.
| | | |
|---|---|---|
| C02F 1/56 | (2006.01) |
| C08F 236/20 | (2006.01) |
| C08F 226/02 | (2006.01) |
| B01J 20/26 | (2006.01) |
| C02F 1/28 | (2006.01) |
| C08F 8/34 | (2006.01) |
| C08F 228/02 | (2006.01) |
| C08F 216/14 | (2006.01) |
| C02F 101/20 | (2006.01) |

(52) U.S. Cl.
CPC ............. *C08F 236/20* (2013.01); *B01J 20/264* (2013.01); *C02F 1/285* (2013.01); *C02F 1/56* (2013.01); *C08F 8/34* (2013.01); *C08F 216/1458* (2013.01); *C08F 216/1466* (2013.01); *C08F 226/02* (2013.01); *C08F 228/02* (2013.01); *C02F 2101/20* (2013.01)

(58) Field of Classification Search
CPC .............................. C08F 236/20; C08F 226/02
See application file for complete search history.

(56) References Cited

U.S. PATENT DOCUMENTS

| | | | |
|---|---|---|---|
| 5,510,040 | A | 4/1996 | Miller et al. |
| 5,523,002 | A | 6/1996 | Carey et al. |
| 6,521,131 | B1 | 2/2003 | Hamilton et al. |
| 2011/0243819 | A1 | 10/2011 | Zinn et al. |
| 2011/0245453 | A1 | 10/2011 | Zinn et al. |

FOREIGN PATENT DOCUMENTS

| | | |
|---|---|---|
| JP | 01164492 | 6/1989 |
| JP | 05287690 | 2/1993 |
| JP | 05302289 | 11/1993 |
| JP | 5311194 A | 11/1993 |
| JP | 07213897 | 8/1994 |
| WO | 0041974 A1 | 7/2000 |
| WO | 2006064940 A1 | 6/2006 |
| WO | 2009121093 A1 | 10/2009 |

OTHER PUBLICATIONS

Machine translation of JP 05-311194 A.*
International Search Report and Written Opinion dated Jun. 3, 2013 which was issued in connection with PCT Patent Application No. US2012/45679 which was filed on Jul. 6, 2012.
Denizli et al., "Dithiocarbamate-Incorporated Monosize Polystyrene Microspheres for Selective Removal of Mercury Ions", Reactive and Functional Polymers, vol. 44, Issue 3, pp. 235-243, Jul. 2000.
Roy et al., "Removal of Heavy Metal Ions using Polydithiocarbamate Resin Supported on Polystyrene", Indian Journal of Chemical Technology, vol. 11, pp. 51-58, Jan. 2004.
Say et al., "Removal of Heavy Metal Ions by Dithiocarbamate-Anchored Polymer/Organosmectite Composites", Applied Clay Science, vol. 31, Issues 3-4, pp. 298-305, Mar. 2006.

* cited by examiner

*Primary Examiner* — Vu A Nguyen
(74) *Attorney, Agent, or Firm* — GE Global Patent Operation

(57) ABSTRACT

The invention relates to a polymer derived from: reaction of glycidyl (meth)acrylate, allyl glycidyl ether or [(vinyloxy)methyl]oxirane with ammonia or primary amine to obtain a mixture of monomer compounds; reaction of the mixture of monomer compounds with at least one of acrylic acid, vinyl alcohol, vinyl acetate, acrylamide, methylacrylic acid, and methylacrylamide to obtain an intermediate polymer; and reaction of the intermediate polymer with a dithiocarbamic acid salt. Methods for using the polymer are also described herein.

19 Claims, No Drawings

POLYMER AND METHOD FOR USING THE SAME

BACKGROUND

The invention relates generally to polymers and methods for using the polymers. In particular, the invention relates to polymers usable for, e.g., removing undesirable elements from aqueous solutions.

Water pollution is an existing and growing worldwide problem. For example, waste water issuing from waste treatment facilities, from the chlor-alkali industry, from the metal finishing industry, and from certain municipal landfills often presents a metal contamination problem. Similarly, the metal content of water exiting both or either of functional and abandoned mines is a significant environmental issue in geographical areas with a mining industry.

Different treatment technologies have been developed to remove either of or both dissolved and suspended metal ions from industrial waters and wastewaters. One common practice is to precipitate the bulk of the metal contaminant as its metal hydroxide. Metal ions such as copper and lead are easily precipitated in this way, but the minimum concentration that can be obtained is limited by the finite solubility of the metal hydroxide. The resulting effluent from the hydroxide precipitation may be treated with a metal scavenging agent to remove trace metal contaminants. The metal scavenging agents may be precipitants, adsorbents, or metal specific ion exchange resins. The metal scavenging agents may also be effective when added in the same step as the hydroxide precipitation. Exemplary compounds utilized as metal scavenging agents include sulfides, (thio)carbonates, alkyl dithiocarbamates, mercaptans, and polydithiocarbamates.

The prior art metal scavenging agents have various limitations. On the other hand, other undesirable elements such as selenium in aqueous solutions need also to be removed. There exists a need, therefore, for a new material to remove undesirable elements such as metals and/or metalloids (e.g., selenium) from aqueous solutions.

BRIEF DESCRIPTION

Embodiments of the invention include polymers and methods for using the polymers.

In one aspect, the present invention relates to a polymer derived from: reaction of glycidyl (meth)acrylate, allyl glycidyl ether or [(vinyloxy)methyl]oxirane with ammonia or primary amine to obtain a mixture of monomer compounds; reaction of the mixture of monomer compounds with at least one of acrylic acid, vinyl alcohol, vinyl acetate, acrylamide, methylacrylic acid, and methylacrylamide to obtain an intermediate polymer; and reaction of the intermediate polymer with a dithiocarbamic acid salt.

In another aspect, the present invention relates to a method comprising: adding an effective amount of the above-mentioned polymer to an aqueous solution comprising at least one element selected from the group consisting of aluminium, arsenic, beryllium, bismuth, cadmium, cobalt, chromium, copper, iron, mercury, manganese, molybdenum, nickel, lead, plutonium, tin, thorium, thallium, uranium, vanadium, tungsten, zirconium, zinc, selenium and combinations thereof to form a precipitate comprising the at least one element; and removing the precipitate from the aqueous solution.

In another aspect, the present invention relates to a polymer comprising structural units of formula I, formula II, and formula III

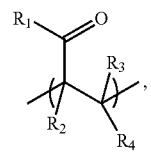

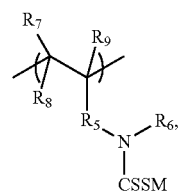

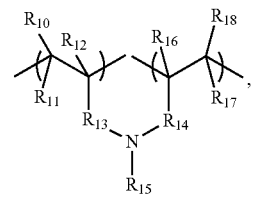

wherein
$R_1$ is —OM or —NH$_2$;
$R_2$, $R_9$, $R_{12}$, and $R_{16}$ are independently hydrogen, or a methyl group;
$R_3$, $R_4$, $R_7$, $R_8$, $R_{10}$, $R_{11}$, $R_{17}$, and $R_{18}$ are independently hydrogen, a methyl group, or —COOH, only one of $R_3$ and $R_4$, or $R_7$ and $R_8$, or $R_{10}$ and $R_{11}$, or $R_{17}$ and $R_{18}$ is —COOH;
$R_5$, $R_{13}$, and $R_{14}$ are independently

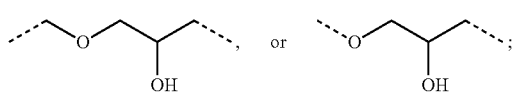

$R_6$ is H,

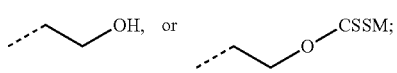

$R_{15}$ is —CSSM,

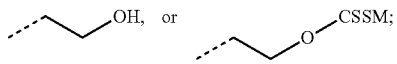

and
M is monovalent cation.

DETAILED DESCRIPTION

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value. Moreover, the suffix "(s)" as used herein is usually intended to include both the singular and the plural of the term that it modifies, thereby including one or more of that term.

Any numerical value ranges recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, from 20 to 80, or from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The primary amine used for preparing the polymer of the present invention may be any primary amines that could react with glycidyl (meth)acrylate, allyl glycidyl ether or [(vinyloxy)methyl]oxirane to obtain a mixture of monomer compounds. Examples of the primary amines include but are not limited to iso-propanolamine, propanolamine, and monoethanol amine.

The mixture of monomer compounds are different depending upon the reaction materials. For example, when allyl glycidyl ether and ammonia are used, compound 1 and compound 2 may be obtained. When allyl glycidyl ether and monoethanol amine are used, compound 3 and compound 4 may be obtained. When [(vinyloxy)methyl]oxirane and ammonia are used, compound 5 and compound 6 may be obtained. The ratios of compounds 1, 3 and 5 to compounds 2, 4 and 6 respectively changed with the feeding ratio changes of allyl glycidyl ether or [(vinyloxy)methyl]oxirane to ammonia or monoethanol amine.

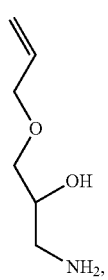

1

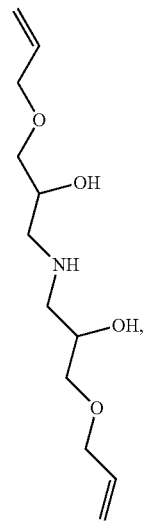

2

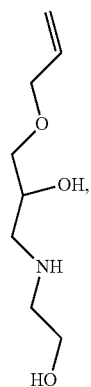

3

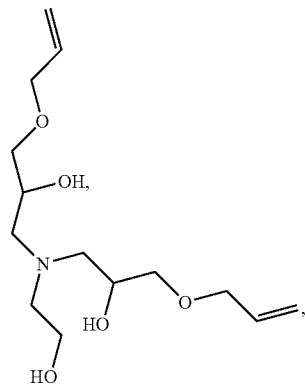

4

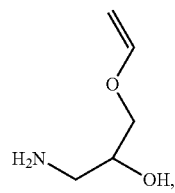

5

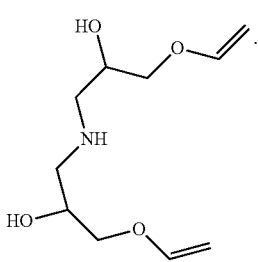

The mixture of monomer compounds react with at least one of acrylic acid

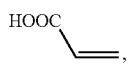

vinyl alcohol

vinyl acetate

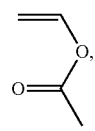

acrylamide

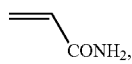

methylacrylic acid

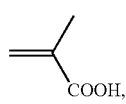

and methylacrylamide

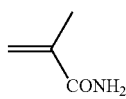

to obtain an intermediate polymer. Because of the existence of, such as compounds 2, 4, and 6, the intermediate polymer may be of a branched structure and the ratio of branches in the intermediate polymer may be adjusted by the feeding ratios of allyl glycidyl ether or [(vinyloxy)methyl]oxirane to ammonia or monoethanol amine.

After reacting the intermediate polymer with a dithiocarbamic acid salt derived from, e.g., reaction of sodium hydroxide with carbon disulfide, a polymer in accordance with embodiments of the present invention may be obtained.

A molecular weight of the polymer may be in a broad range, such as greater than about 2,000, or in a range of from about 2,000 to about 500,000, or in a range of from about 500 to about 2,000,000.

In some embodiments, the polymer may be added to an aqueous solution comprising at least one element selected from the group consisting of aluminium, arsenic, beryllium, bismuth, cadmium, cobalt, chromium, copper, iron, mercury, manganese, molybdenum, nickel, lead, plutonium, tin, thorium, thallium, uranium, vanadium, tungsten, zirconium, zinc, selenium and combinations thereof to form a precipitate comprising the at least one element to remove the at least one element by removing the precipitate from the aqueous solution.

In some embodiments, the polymer comprises structural units of formula A, structural unit of formula B, and, structural unit of formula C or structural unit of formula D

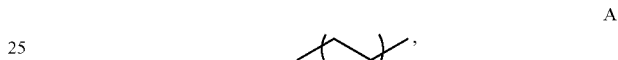

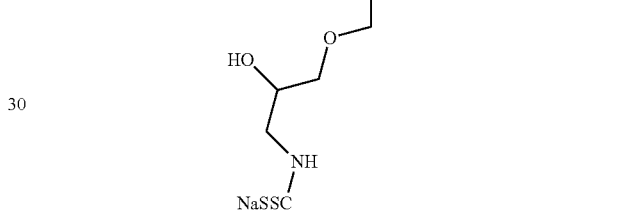

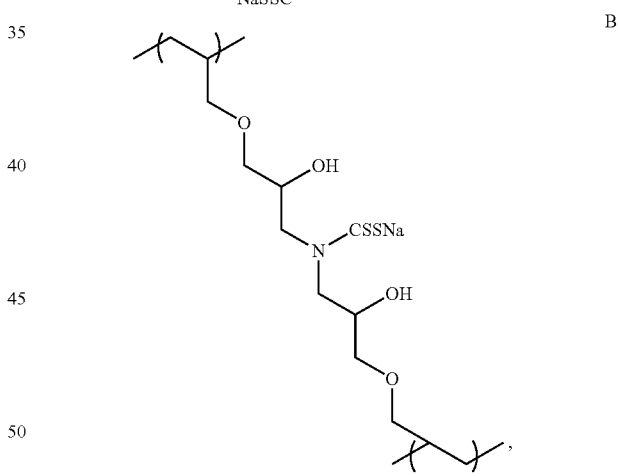

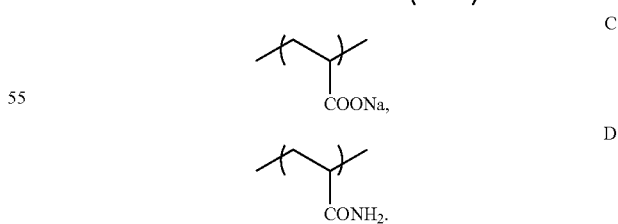

In some embodiments, the polymer comprises structural units of formula E, structural unit of formula F, and, structural unit of formula C or structural unit of formula D

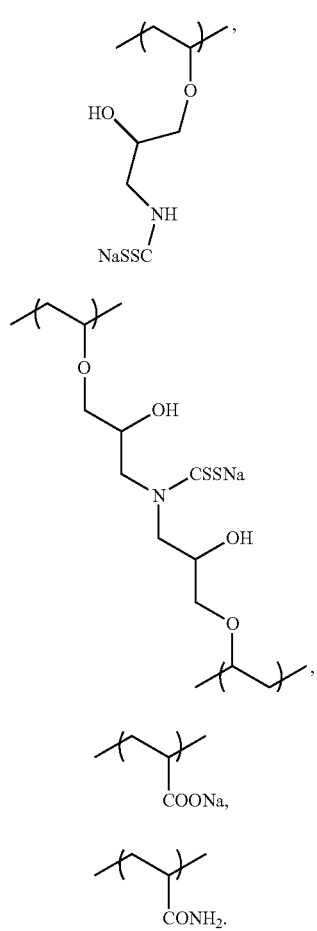
In some embodiments, the polymer comprises structural unit of formula C, at least one of structural unit of formula H and structural unit of formula I, and, at least one of structural unit of formula J and structural unit of formula K
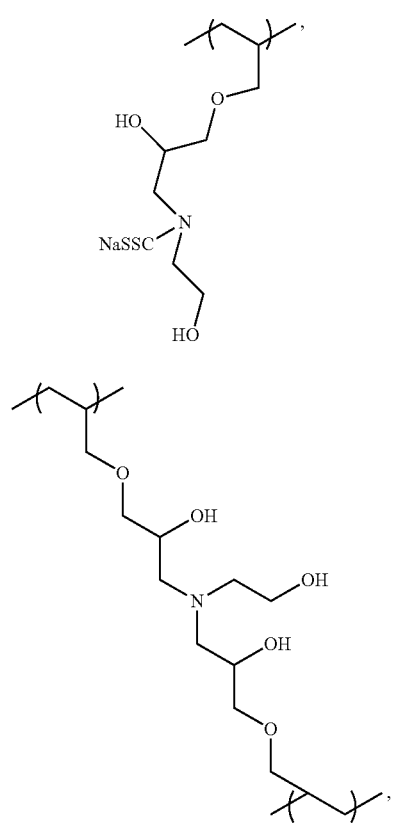
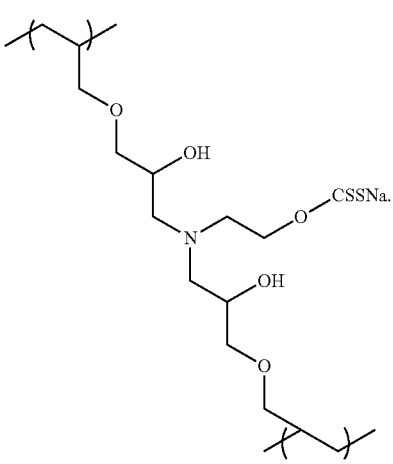
In some embodiments, the polymer comprises structural units of formula I, formula II, and formula III
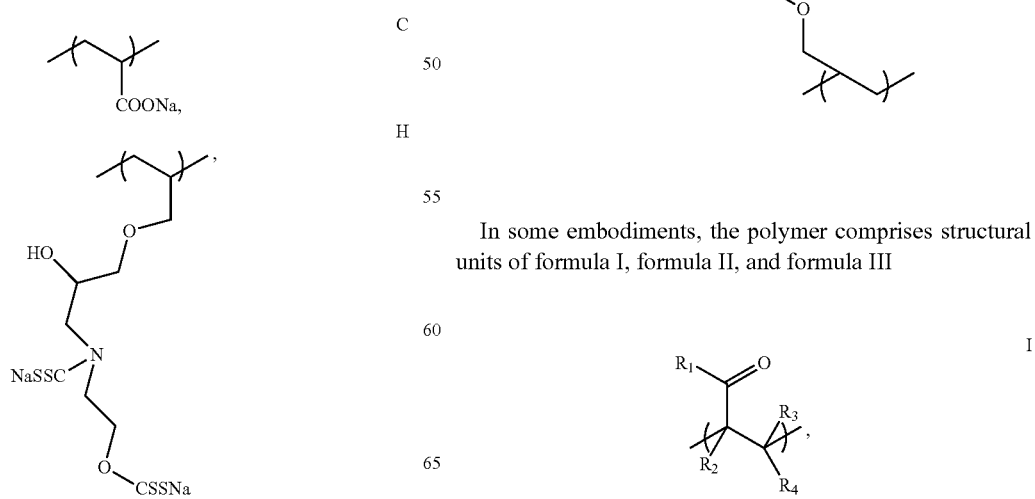

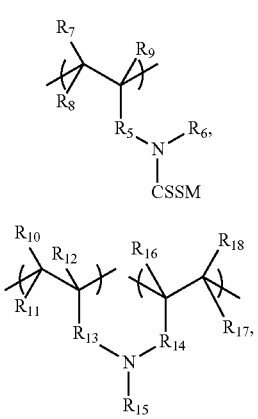

wherein
R$_1$ is —OM or —NH$_2$;
R$_2$, R$_9$, R$_{12}$, and R$_{16}$ are independently hydrogen, or a methyl group;
R$_3$, R$_4$, R$_7$, R$_8$, R$_{10}$, R$_{11}$, R$_{17}$, and R$_{18}$ are independently hydrogen, a methyl group, or —COOH, only one of R$_3$ and R$_4$, or R$_7$ and R$_8$, or R$_{10}$ and R$_{11}$, or R$_{17}$ and R$_{18}$ is —COOH;
R$_5$, R$_{13}$, and R$_{14}$ are independently

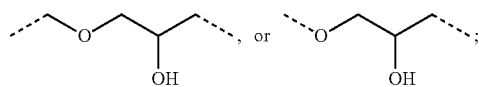

R$_6$ is H,

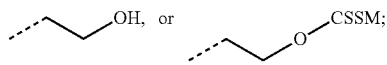

R$_{15}$ is —CSSM,

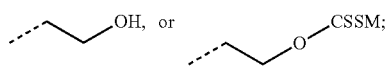

and
M is monovalent cation.

Different structural units in the polymer may be arranged alternately or each of the different structural units may repeat itself twice or more times in the polymer before it connects to another different structural unit. A ratio of different structural units in the copolymer with respect to each other may be in a broad range. In some embodiments, the polymer comprises from about 0.1 mol % to about 40 mol % of structural units of formula III based on a total of structural units of formula I, II and III. In some embodiments, the polymer comprises from about 1 mol % to about 10 mol % of structural units of formula III based on a total of structural units of formula I, II and III. The polymer may comprise one or more different structural units other than structural units set as examples herein.

The polymer may be added alone or in combination with other additives into the aqueous solution. Examples of other additives include but are not limited to inorganic or polymer flocculants. When the aqueous solution comprises calcium ions or magnesium ions, the reduction rates of the at least one element after treatment by the polymer of present invention are significantly higher than where the aqueous solution does not comprise calcium ions or magnesium ions. The calcium ions or magnesium ions may be added into the aqueous solution in the form of chloride or sulfate. A concentration of the calcium ions or magnesium ions in the aqueous solution may be at least about 50 ppm, at least about 90 ppm or at least about 200 ppm.

The amount of the polymer added may vary according to the application environment, e.g., the amount and type of elements to be removed and effects of other materials coexisting with the elements in the aqueous solutions. In some embodiments, a concentration ratio by weight of each of the at least one element to the polymer in the aqueous solution ranges from about 100:1 to about 1:1000.

In some embodiments, the at least one element is selected from the group consisting of mercury, chromium, copper, zinc, lead, cobalt, cadmium, nickel and combinations thereof.

A pH of the aqueous solution may be of any values. In some embodiments, a pH of the aqueous solution is at least about 7. The precipitate may be removed by any suitable ways. In some embodiments, the removing is by filtering the precipitate from the aqueous solution or by sedimentation.

EXAMPLES

The following examples are included to provide additional guidance to those of ordinary skill in the art in practicing the claimed invention. Accordingly, these examples do not limit the invention as defined in the appended claims.

Allyl glycidyl ether (>99%) was from DAISO Chemical Co. Ltd., Japan. Acrylic acid, acrylamide, ammonia (25%), monoethanol amine, hydrochloric acid (37% solution), calcium chloride anhydrous and isopropanol were from Sinopharm Chemical Reagent Co., Ltd, Shanghai, China. 2,2'-Azobis(2-methylpropionamidine) dihydrochloride and sodium persulfate (Na$_2$S$_2$O$_8$) were from Aldrich Chemical Co., Milwaukee, Wis., USA, unless otherwise specified and were used without further purification. Atomic absorption Spectrometer (AA)/inductively coupled plasma (ICP) standard solutions of chromium (Cr), copper (Cu), zinc (Zn), lead (Pb), cobalt (Co), cadmium (Cd), selenium (Se), boron (B) and nickel (Ni) were obtained from Shanghai Analytical Center, at concentrations of from 1,000 ppm to 10,000 ppm. Each of the ICP standard solutions comprises 2%-10% (by weight) of nitric acid.

Nuclear magnetic resonance (NMR) spectra were recorded on a Bruker Avance™ 400 ($^1$H & $^{13}$C, 400 MHz) spectrometer and referenced versus residual solvent shifts.

Molecular weights were determined using gel permeation chromatography (GPC) analyses performed at 40° C. using an apparatus equipped with a Waters 590 pump and a Waters 717—plus injector. A differential refractometry (Waters R410) was used for detection. The column set were Shodex SB-805 HQ/SB-804 HQ with SB-G guard column. The eluent was the aqueous solution of 0.1 mol/l NaNO$_3$ and 0.02% by weight NaN$_3$ and had a flow rate of 0.5 mL/min. Calibration was performed using polyacrylic acid sodium salt (Mp 2,925-782,200). The software used for data acquisition, calibration and treatment was Cirrus™ multidetector GPC software.

Example 1

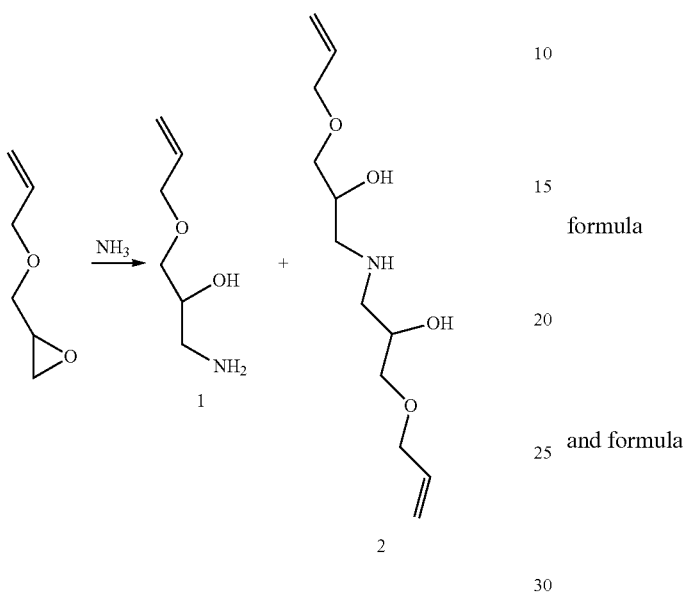

To a 250 mL three-neck round bottom flask equipped with a thermometer, a nitrogen inlet and addition inlet was charged 83.5 g of ammonia (25% solution). The solution was heated to 30° C. Then allyl glycidyl ether (AGE) (18.7 g) was charged dropwise over 90 minutes under nitrogen atmosphere. Upon completion of the addition, the reaction mixture was heated to 55° C. for 60 minutes. While sparging with nitrogen, the solution was heated at 65° C. for 30 minutes to remove excess $NH_3$. Then the product mixture (compounds 1 and 2) was cooled to room temperature for further polymerization. $^1H$ NMR (δ, $D_2O$) 5.93 (br, 1H), 5.26 (br, 2H), 4.03 (d, 2H), 3.74-3.91 (br, 1H), 3.48 (br, 2H), 2.62 (br, 2H). The structure of the products was verified by $^{13}C$ NMR, $^1H$-$^1H$ correlation spectroscopy (COSY) and $^1H$-$^{13}C$ heteronuclear single quantum coherence (HSQC) spectrums to be consistent with the structure shown. The mole ratio of compound 1 to compound 2 is 7.74/2.26.

Example 2

To a 250 mL three neck round bottom flask equipped with a thermometer, a nitrogen inlet and addition inlet was charged 27 g of deionized water and 43.64 g (85.2 mmol) product of example 1. Then the pH of solution was adjusted to ~5.0 with hydrochloric acid. While sparging with nitrogen, the solution was heated to 80° C. Then the solution of acrylic acid (2.63 g, 36.5 mmol) was fed to the flask by peristalic pump over 90 minutes. The solution of sodium persulfate (0.58 g, 2.4 mmol, 2%) was simultaneously fed over 100 minutes. Upon completion of all the additions, the reactor contents were heated to 90° C. for 90 minutes. $^1H$ NMR analysis indicated all the monomers were consumed. The reaction mixture was then cooled to lower than 40° C., then poured into 250 ml isopropanol. The solid copolymer was precipitated from the isopropanol solution, washed with isopropanol (20 ml*3) and dried by a vacuum oven at 55° C. The structure of the resulting copolymer was verified by $^1H$ NMR and $^{13}C$ NMR as evidenced by the peaks between the region of 1 ppm-4.5 ppm, $^1H$ NMR (δ, $D_2O$) 1.5 (br, 4.72; H), 2.4 (br, 1H), 2.8-4.5 (br, 6.35) and comprises structural units of formula

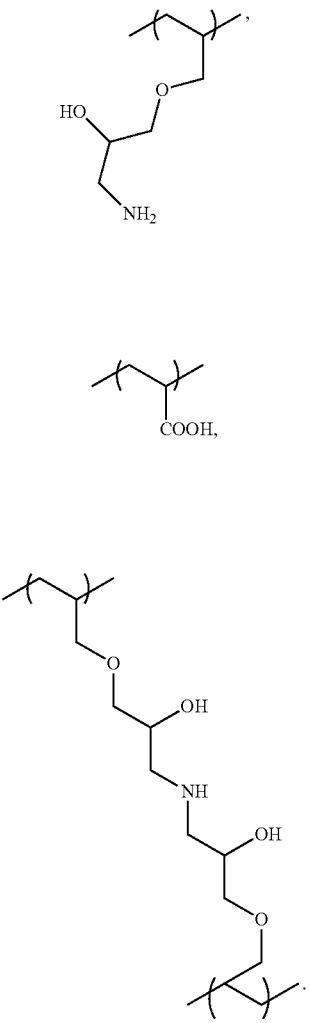

formula and formula

Example 3

To a 50 mL three neck round bottom flask equipped with a thermometer, a nitrogen inlet and addition inlet was charged a solution of 3.4 g polymer prepared from example 2 and 15 g of deionized water. Then 1.24 g sodium hydroxide (30.5 mmol) was dissolved into the solution under ice water bath. The nitrogen sparge was then switched to nitrogen blank and carbon disulfide (0.92 g, 12.1 mmol) was charged dropwise over a 15 minutes period with ice water cooling. After addition, the batch was mixed 1 hour with cooling, then was allowed to gradually warm to room temperature. Any residual carbon disulfide was then removed from the product by sparging with nitrogen. The structure of the resulting copolymer was verified by $^{13}C$ NMR as evidenced by the peaks between the region of 180 ppm-220 ppm, $^{13}C$ NMR (δ, $D_2O$) 186 (br), 213 (br) and comprises structural units of formula formula

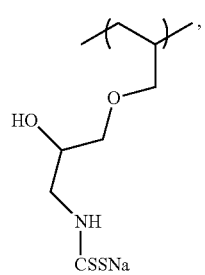

and formula

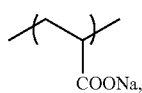

and formula

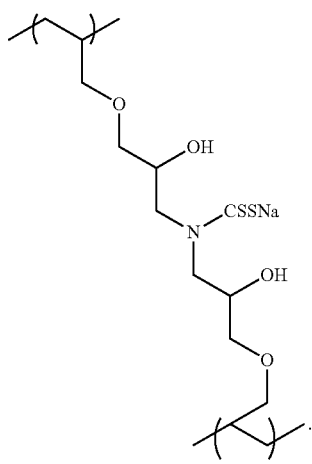

Example 4

To a 100 mL three neck round bottom flask equipped with a thermometer, a nitrogen inlet and addition inlet was charged 16 g of deionized water and 18.4 g (34.7 mmol) product of example 1. Then the pH of solution was adjusted to ~5.0 with hydrochloric acid. While sparging with nitrogen, the solution was heated to 80° C. Then the solution of acrylic acid (2.58 g, 35.8 mmol) was fed to the flask by peristalic pump over 90 minutes. The solution of sodium persulfate (0.34 g, 1.41 mmol, 2%) was simultaneously fed over 100 minutes. Upon completion of all the additions, the reactor contents were heated to 90° C. for 90 minutes. The reaction was then cooled to lower than 40° C., and then poured into 150 ml isopropanol. The copolymer was precipitated from the isopropanol, washed with isopropanol (20 mL*3) and dried by vacuum oven at 55° C. The structure of the resulting copolymer was verified by $^1$H NMR and $^{13}$C NMR as evidenced by the peaks between the region of 1 ppm-4.5 ppm, $^1$H NMR ($\delta$, D$_2$O) 1.5 (br, 3.73; H), 2.4 (br, 1H), 2.8-4.5 (br, 4.1H) and comprises structural units of formula

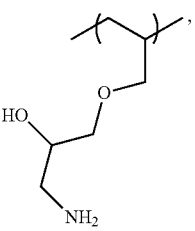

formula

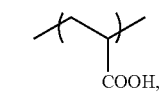

and formula

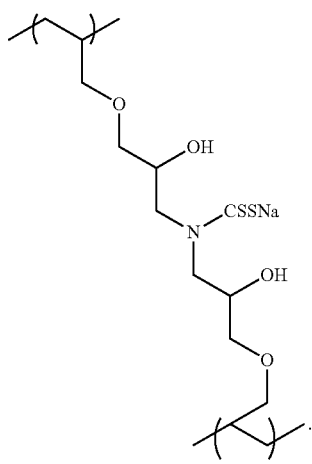

Example 5

To a 50 mL three neck round bottom flask equipped with a thermometer, a nitrogen inlet and addition inlet was charged a solution of 3.1 g polymer prepared from example 4 and 13 g deionized water. Then 1.16 g (29.1 mmol) sodium hydroxide was dissolved into the solution under ice water bath. The nitrogen sparge was then switched to nitrogen blank and carbon disulfide (0.71 g, 9.3 mmol) was charged dropwise over a 15 minutes period with ice water cooling. After addition, the batch was mixed 1 hour with cooling, then was allowed to gradually warm to room temperature. Any residual carbon disulfide was then removed from the product by sparging with nitrogen. The structure of the resulting copolymer was verified by $^{13}$C NMR as evidenced by the peaks between the region of 180 ppm-220 ppm, $^{13}$C NMR ($\delta$, D$_2$O) 186 (br), 213 (br) and comprises structural units of formula formula

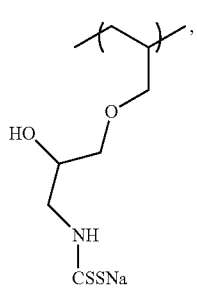

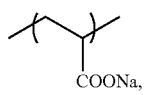

and formula

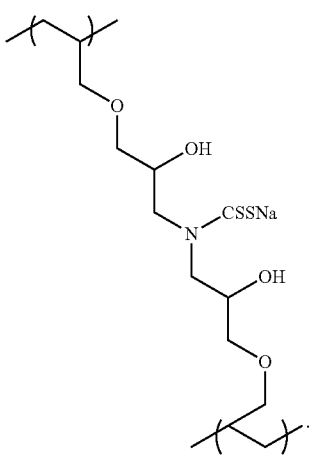

Example 6

To a 100 mL three neck round bottom flask equipped with a thermometer, a nitrogen inlet and addition inlet was charged 18 g of deionized water and 22.52 g (41.7 mmol) product of example 1. Then the pH of solution was adjusted to ~5.0 with hydrochloric acid. While sparging with nitrogen, the solution was heated to 80° C. Then the solution of acrylic acid (3.16 g, 44 mmol) was fed to the flask by peristaltic pump over 90 minutes. The solution of 2,2'-azobis(2-methylpropionami-dine) dihydrochloride (0.16 g, 0.6 mmol, 0.7%) was simultaneously fed over 100 minutes. Upon completion of all the additions, the reactor contents were heated to 90° C. for 90 minutes. The reaction was then cooled to lower than 40° C., and then poured into 150 ml isopropanol. The copolymer was precipitated from isopropanol, washed with isopropanol (20 mL*3) and dried by vacuum oven at 55° C. The structure of the resulting copolymer was verified by $^1$H NMR and $^{13}$C NMR as evidenced by the peaks between the region of 1 ppm-4.5 ppm, $^1$H NMR (δ, D$_2$O) 1.5 (br, 2.85; H), 2.4 (br, 1H), 2.8-4.5 (br, 2H) and comprises structural units of formula

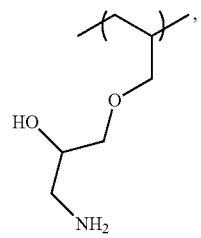

formula

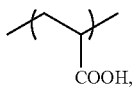

and formula

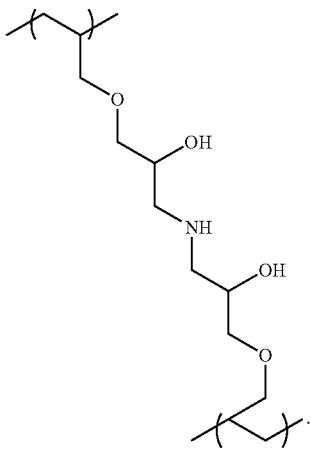

Example 7

To a 50 mL three neck round bottom flask equipped with a thermometer, a nitrogen inlet and addition inlet was charged a solution of 3.5 g polymer prepared from example 6 and 13 g of deionized water. Then 1.86 g (45.9 mmol) sodium hydroxide was dissolved into the solution under ice water bath. The nitrogen sparge was then switched to nitrogen blank and carbon disulfide (0.76 g, 9.9 mmol) was charged dropwise over a 15 minutes period with ice water cooling. After addition, the batch was mixed 1 hour with cooling, then was allowed to gradually warm to room temperature. Any residual carbon disulfide was then removed from the product by sparging with nitrogen. The structure of the resulting copolymer was verified by $^{13}$C NMR as evidenced by the peaks between the region of 180 ppm-220 ppm, $^{13}$C NMR (δ, D$_2$O) 186 (br), 213 (br) and comprises structural units of formula formula

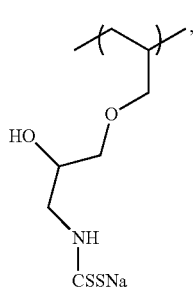

and formula

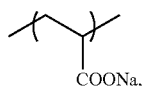

and formula

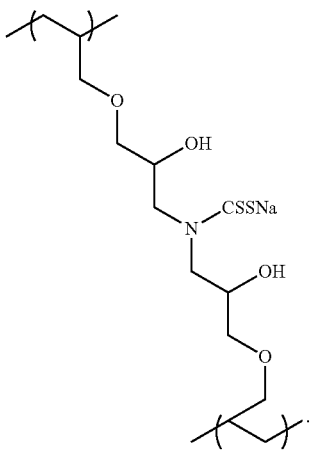

Example 8

To a 100 mL three neck round bottom flask equipped with a thermometer, a nitrogen inlet and addition inlets was charged 13 g of deionized water, 5 g isopropanol and 16.4 g (31.9 mmol) product of example 1. Then the pH of solution was adjusted to ~5.0 with hydrochloric acid. While sparging with nitrogen, the solution was heated to 80° C. Then the solution of acrylic acid (1.0 g, 13.9 mmol) was fed to the flask by peristalic pump over 90 minutes. The solution of sodium persulfate (0.3 g, 1.26 mmol, 2.75%) was simultaneously fed over 100 minutes. Upon completion of all the additions, the reactor contents were heated to 90° C. for 90 minutes. The reaction was then cooled to lower than 40° C., then poured into 250 ml isopropanol. The copolymer was precipitated from isopropanol, washed with isopropanol (20 mL*3) and dried by vacuum oven at 55° C. The structure of the resulting copolymer was verified by $^1$H NMR and $^{13}$C NMR as evidenced by the peaks between the region of 1 ppm-4.5 ppm, $^1$H NMR (δ, D$_2$O) 1.5 (br, 4.13; H), 2.4 (br, 1H), 2.8-4.5 (br, 5H) and comprises structural units of formula

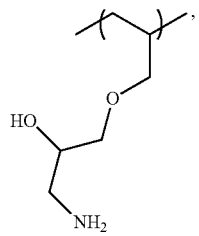

formula

and formula

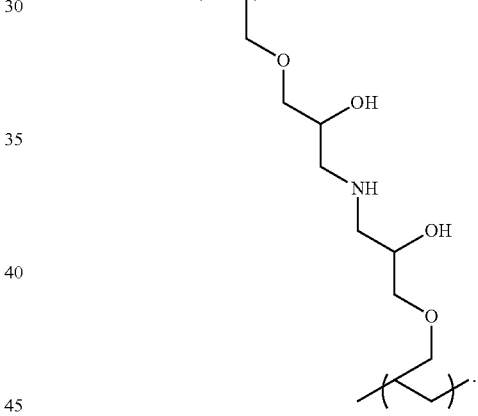

Example 9

To a 25 mL three neck round bottom flask equipped with a thermometer, a nitrogen inlet and addition inlet were charged 0.6 g polymer prepared in example 8 and 10 g deionized water. Then 1.32 g (33 mmol) sodium hydroxide was dissolved into the solution under ice water bath. The nitrogen sparging was then switched to nitrogen blank and carbon disulfide (0.21 g, 2.7 mmol) was charged dropwise over a 15 minutes period with ice water cooling. After addition, the batch was mixed 1 hour with cooling, then was allowed to gradually warm to room temperature. Any residual carbon disulfide was then removed from the product by sparging with nitrogen. The structure of the resulting polymer was verified by $^{13}$C NMR as evidenced by the peaks between the region of 180 ppm-220 ppm, $^{13}$C NMR (δ, D$_2$O) 186 (br), 213 (br). Mw: 25794, PD: 3.1 and comprises structural units of formula formula

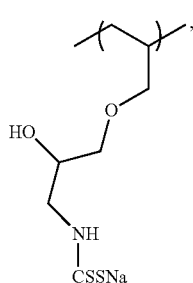

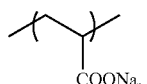

and formula

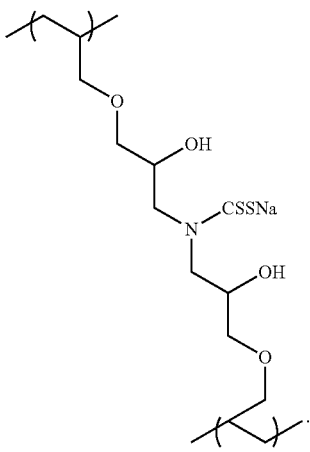

Example 10

To a 50 mL three neck round bottom flask equipped with a thermometer, a nitrogen inlet and addition inlet was charged 12.5 g deionized water and 10.12 g (19.75 mmol) product of example 1. Then the pH of solution was adjusted to ~5.0 with hydrochloric acid. While sparging with nitrogen, the solution was heated to 80° C. Then the solution of acrylic acid (1.35 g, 18.75 mmol) was fed to the flask by peristalic pump over 90 minutes. The solution of sodium persulfate (0.19 g, 0.77 mmol, 2%) was simultaneously fed over 100 minutes. Upon completion of all the additions, the reactor contents were heated to 90° C. for 90 minutes. The reaction was then cooled to lower than 40° C., and then poured into 250 ml isopropanol. The copolymer was precipitated from isopropanol, washed with isopropanol (20 mL*3) and dried by vacuum oven at 55° C. The structure of the resulting copolymer was verified by $^1$H NMR and $^{13}$C NMR as evidenced by the peaks between the region of 1 Ppm-4.5 ppm, $^1$H NMR (δ, D$_2$O) 1.5 (br, 3.81H), 2.4 (br, 1H), 2.8-4.5 (br, 4.23H) and comprises structural units of formula

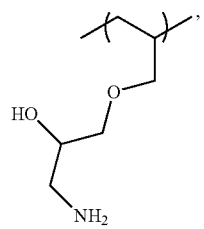

formula

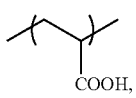

and formula

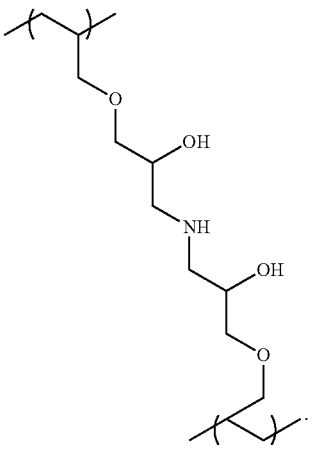

Example 11

To a 50 mL three neck round bottom flask equipped with a thermometer, a nitrogen inlet and addition inlet was charged 2.18 g polymer prepared from example 10 and 8 g deionized water. Then 1.12 g (28 mmol) sodium hydroxide was dissolved into the solution under ice water bath. The nitrogen sparge was then switched to nitrogen blank and carbon disulfide (0.56 g, 7.4 mmol) was charged dropwise over a 15 minutes period with ice water cooling. After addition, the batch was mixed 1 hour with cooling, then was allowed to gradually warm to room temperature. Any residual carbon disulfide was then removed from the product by sparging with nitrogen. The structure of the resulting copolymer was verified by $^{13}$C NMR as evidenced by the peaks between the region of 180 ppm-220 ppm, $^{13}$C NMR (δ, D$_2$O) 186 (br), 213 (br). Mw: 36393, PD: 3.5 and comprises structural units of formula formula

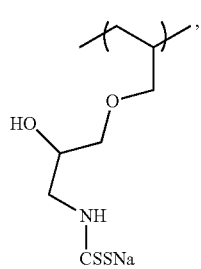

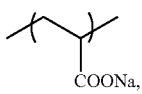

and formula

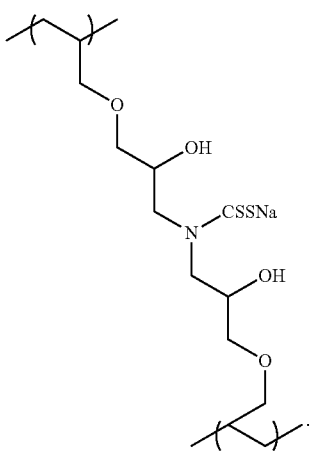

Example 12

To a 50 mL three neck round bottom flask equipped with a thermometer, a nitrogen inlet and addition inlet was charged 11 g deionized water and 11.68 g (22.85 mmol) product of example 1. While sparging with nitrogen, the solution was heated to 80° C. Then the mixture solution (pH=9) of acrylic acid (1.64 g, 22.8 mmol) and ammonia was fed to the flask by peristalic pump over 90 minutes. The solution of sodium persulfate (0.2 g, 0.84 mmol, 1.84%) was simultaneously fed over 100 minutes. Upon completion of all the additions, the reactor contents were heated to 90° C. for 90 minutes. The reaction was then cooled to lower than 40° C., and then poured into 250 ml isopropanol. The copolymer was precipitated from isopropanol, washed with isopropanol (20 mL*3) and dried by vacuum oven at 55° C. The structure of the resulting copolymer was verified by $^1$H NMR and $^{13}$C NMR as evidenced by the peaks between the region of 1 ppm-4.5 ppm, $^1$H NMR ($\delta$, D$_2$O) 1.5 (br, 3.02; H), 2.4 (br, 1H), 2.8-4.5 (br, 2.4H) and comprises structural units of formula

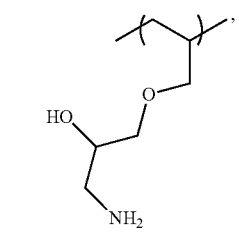

formula

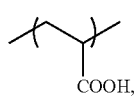

and formula

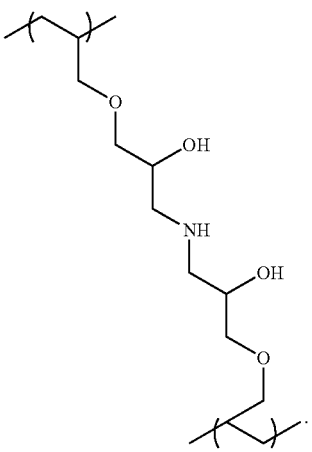

Example 13

To a 25 mL three neck round bottom flask equipped with a thermometer, a nitrogen inlet and addition inlet was charged 1.5 g (11.6 mmol) polymer prepared in example 12 and 8 g of deionized water. Then 0.48 g (12 mmol) sodium hydroxide was dissolved into the solution under ice water bath. The nitrogen sparge was then switched to nitrogen blank and carbon disulfide (0.26 g, 3.48 mmol) was charged dropwise over a 15 minutes period with ice water cooling. After addition, the batch was mixed 1 hour with cooling, then was allowed to gradually warm to room temperature. Any residual carbon disulfide was then removed from the product by sparging with nitrogen. The structure of the resulting copolymer was verified by $^{13}$C NMR as evidenced by the peaks between the region of 180 ppm-220 ppm and comprises structural units of formula formula

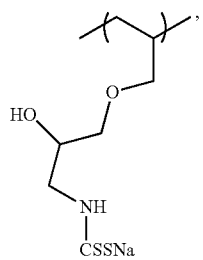

and formula

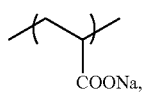

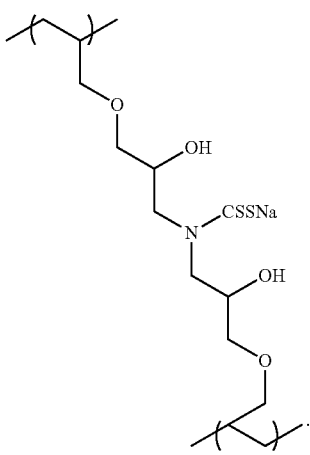

Example 14

To a 50 mL three neck round bottom flask equipped with a thermometer, a nitrogen inlet and addition inlet was charged 9.5 g of deionized water and 7.24 g (14.17 mmol) product of example 1. Then the pH of solution was adjusted to ~5.0 with hydrochloric acid (10.6 mmol). While sparging with nitrogen, the solution was heated to 85° C. Then the solution of acrylic acid (2.376 g, 32.97 mmol) was fed to the flask by peristalic pump over 90 minutes. The solution of sodium persulfate (0.39 g, 1.65 mmol, 3.5%) was simultaneously fed over 100 minutes. Upon completion of all the additions, the reactor contents were heated to 95° C. for 90 minutes. The reaction was then cooled to lower than 40° C. Then 1.92 g (48 mmol) sodium hydroxide was dissolved into the solution under ice water bath. The nitrogen sparge was then switched to nitrogen blank and carbon disulfide (1.06 g, 14.14 mmol) was charged dropwise over a 15 minutes period with ice water cooling. After addition, the batch was mixed 1 hour with cooling, then was allowed to gradually warm to room temperature. Any residual carbon disulfide was then removed from the product by sparging with nitrogen. The structure of the resulting copolymer was verified by $^{13}C$ NMR as evidenced by the peaks between the region of 180 ppm-220 ppm and comprises structural units of formula formula

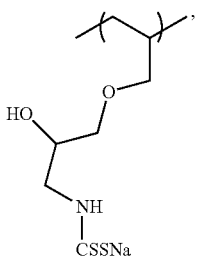

and formula

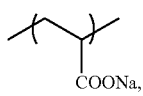

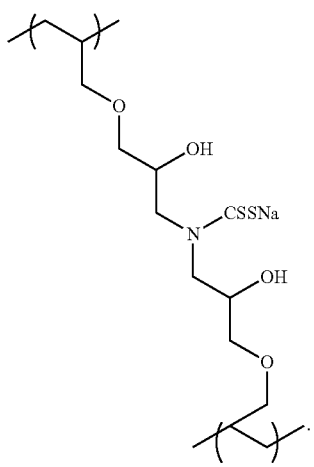

Example 15

Under similar reaction conditions with EXAMPLE 14, dithiocarbamate sodium salt of copolymers of acrylamide, compounds 1 and 2 were also synthesized. Detailed data about synthesis of the copolymers are shown in the following table.

TABLE 1

| sample code | molar ratio (acrylamide/total of compounds of 1 and 2) | yield (polymer/total of monomers, weight %) |
| --- | --- | --- |
| 1 | 5/5 | 50 |
| 2 | 7/3 | 55 |
| 3 | 9/1 | 73 |

The copolymers comprise structural units of formula

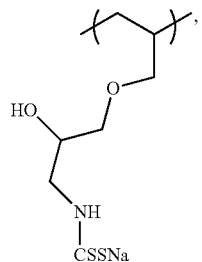

formula

and formula

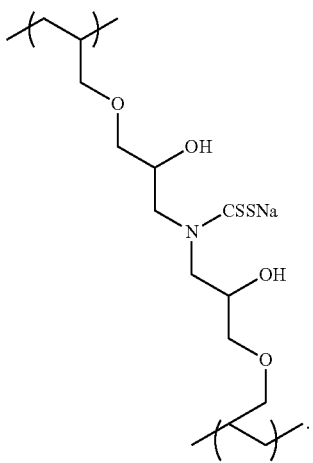

Example 16

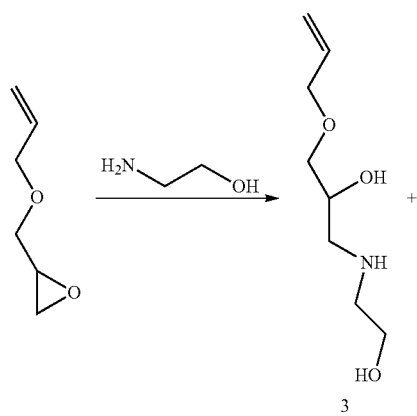

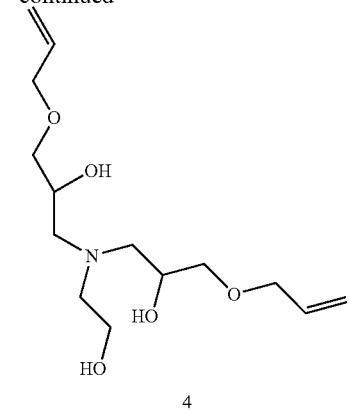

To a 100 mL three-neck round bottom flask equipped with a thermometer, a nitrogen inlet and addition inlet was charged 20.1 g (0.33 mol) of monoethanol amine. The solution was stirred at room temperature. Then pure allyl glycidyl ether (AGE) (15 g, 0.13 mol) was charged dropwise over 120 minutes under nitrogen atmosphere. Upon completion of the addition, the reaction mixture was stirred for 120 minutes at room temperature. Excess amount of monoethanol amine was removed by vacuum distillation (58° C.-64° C., 17 mmHg-23 mmHg). Then the reaction mixture (compounds 3 and 4) was cooled to room temperature for further polymerization. $^1$H NMR ($\delta$, $D_2O$) 5.85 (br, 1H), 5.21 (br, 2H), 3.96 (br, 2H), 3.82 (br, 1H), 3.38-3.58 (br, 4.23H), 2.48-2.63 (br, 4.23H). Residual monoethanol amine was 4.8% according to high performance liquid chromatography (HPLC). The mole ratio of compound 3 to compound 4 was 89/11 (From $^{13}$CNMR, $\delta$=60.11 (compound 3, 100), 59.11 (compound 4, 12.48).

Example 17

To a 100 mL three-neck round bottom flask equipped with a thermometer, a nitrogen inlet and addition inlet was charged 29.74 g (0.487 mol) of monoethanol amine. The solution was stirred at room temperature. Then pure allyl glycidyl ether (AGE) (18.5 g, 0.162 mol) was charged dropwise over 150 minutes under nitrogen atmosphere. Upon completion of the addition, the reaction mixture was stirred for 120 minutes at room temperature. Excess amount of monoethanol amine was removed by vacuum distillation (58° C.-64° C., 17 mmHg-23 mmHg). Then the reaction mixture (compounds 3 and 4) was cooled to room temperature for further polymerization. $^1$H NMR ($\delta$, $D_2O$) 5.85 (br, 1H), 5.21 (br, 2H), 3.96 (br, 2H), 3.82 (br, 1H), 3.38-3.58 (br, 4.32H), 2.48-2.63 (br, 4.32H). Residual monoethanol amine was 7.6% according to HPLC. The mole ratio of compound 3 to compound 4 was 90.7/9.3 (From $^{13}$CNMR, $\delta$=60.22 (compound 3, 100), 59.3 (compound 4, 10.2).

Example 18

To a 1000 mL three-neck round bottom flask equipped with a thermometer, a nitrogen inlet and addition inlet was charged 275 g (4.5 mol) of monoethanol amine. The solution was stirred at room temperature. Then pure allyl glycidyl ether (AGE) (135 g, 1.18 mol) was charged dropwise over 5 hours under nitrogen atmosphere. Upon completion of the addition, the reaction mixture was stirred for 120 minutes at room temperature. Excess amount of monoethanol amine was removed by vacuum distillation (58° C.-64° C., 17 mmHg-23 mmHg). Then the reaction mixture (compounds 3 and 4) was cooled to room temperature for further polymerization. $^1$H NMR ($\delta$, D$_2$O) 5.87 (br, 1H), 5.21 (br, 2H), 3.98 (br, 2H), 3.84 (br, 1H), 3.4-3.59 (br, 4H), 2.49-2.65 (br, 4H). Residual monoethanol amine was 1.25% according to HPLC. The mole ratio of compound 3 to compound 4 was 94/6 (From $^{13}$CNMR, $\delta$=60.18 (compound 3, 100), 59.16 (compound 4, 6.88).

Example 19

To a 1000 mL three-neck round bottom flask equipped with a thermometer, a nitrogen inlet and addition inlet was charged 397.05 g (6.5 mol) of monoethanol amine. The solution was stirred at ice-water temperature. Then pure allyl glycidyl ether (AGE) (148.36 g, 1.3 mol) was charged dropwise over 3 hours under nitrogen atmosphere. Upon completion of the addition, the reaction mixture was stirred for 3 hours at room temperature. Excess amount of monoethanol amine was removed by vacuum distillation (58° C.-64° C., 17 mmHg-23 mmHg). Then the reaction mixture (compounds 3 and 4) was cooled to room temperature for further polymerization. $^1$H NMR ($\delta$, D$_2$O) 5.84 (br, 1H), 5.21 (br, 2H), 3.97 (br, 2H), 3.82 (br, 1H), 3.39-3.57 (br, 4H), 2.48-2.63 (br, 4H). Residual monoethanol amine was 1% according to HPLC. The mole ratio of compound 3 to compound 4 was 95/5 (From $^{13}$CNMR, $\delta$=60.15 (compound 3, 100), 59.1 (compound 4, 4.95).

Example 20

To a 100 mL three-neck round bottom flask equipped with a thermometer, a nitrogen inlet and addition inlet was charged 11.36 g (0.186 mol) of monoethanol amine. The solution was stirred at room temperature. Then pure allyl glycidyl ether (AGE) (18.5 g, 0.162 mol) was charged dropwise over 150 minutes under nitrogen atmosphere. Upon completion of the addition, the reaction mixture was stirred for 120 minutes at room temperature. Then the reaction mixture (compounds 3 and 4) was used for further polymerization. $^1$HNMR ($\delta$, D$_2$O) 5.85 (br, 1H), 5.21 (br, 2H), 3.96 (br, 2H), 3.82 (br, 1H), 3.38-3.58 (br, 4.32H), 2.48-2.63 (br, 4.32H). Residual monoethanol amine was 7.6% according to HPLC. The mole ratio of compound 3 to compound 4 was 63/37 (From $^{13}$CNMR, $\delta$=60.20 (compound 3, 100), 59.2 (compound 4, 58.7).

Example 21

To a 50 mL three neck round bottom flask equipped with a thermometer, a nitrogen inlet and addition inlet was charged 11 g of deionized water and 4 g solution prepared from example 16. Then the pH of solution was adjusted to ~5.0 with hydrochloric acid. While sparging with nitrogen, the solution was heated to 80° C. Then the solution of acrylic acid (3.35 g, 46.5 mmol) was fed to the flask by peristalic pump over 90 minutes. The solution of sodium persulfate (0.474 g, 2 mmol, 3%) was simultaneously fed over 105 minutes. Upon completion of all the additions, the reactor contents were heated to 90° C. for 90 minutes. The reaction mixture was then cooled to room temperature. The structure of the resulting polymer was verified by $^1$H NMR as evidenced by the peaks between the region of 1 ppm-4.5 ppm, $^1$H NMR ($\delta$, D$_2$O) 1.2-1.7 (br, 3.16; H), 2.28 (br, 1H), 2.97 (br, 0.66H), 3.09 (br, 1.27H), 3.28-4.1 (br, 4H) and comprises structural units of formula

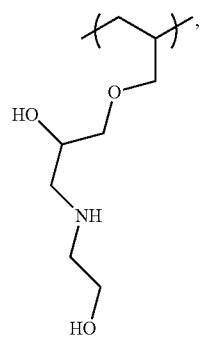

formula

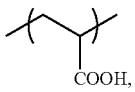

and formula

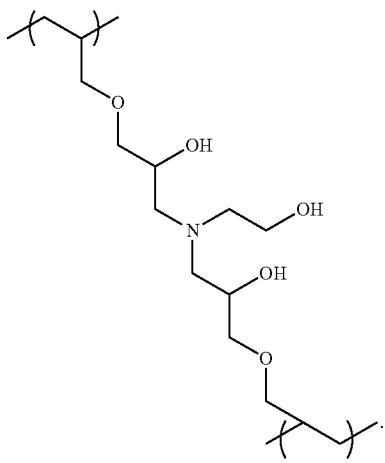

Example 22

To a 100 mL three neck round bottom flask equipped with a thermometer, a nitrogen inlet and addition inlet was charged 47 g polymer solution prepared from example 21. Then 13 g solution of sodium hydroxide (3.6 g, 90 mmol) was added into the polymer solution under ice water bath. The nitrogen sparge was then switched to nitrogen blank and carbon disulfide (1.67 g, 22 mmol) was charged dropwise over a 15 minutes period with ice water cooling. After addition, the batch was mixed 1 hour with cooling, then was allowed to gradually warm to room temperature. Any residual carbon disulfide was then removed from the product by sparging with nitrogen. The structure of the resulting polymer was verified by $^{13}$C NMR as evidenced by the peaks between the region of 180 ppm-220 ppm, $^{13}$C NMR ($\delta$, D$_2$O) 185 (br), 211 (br) and comprises structural units of formula formula 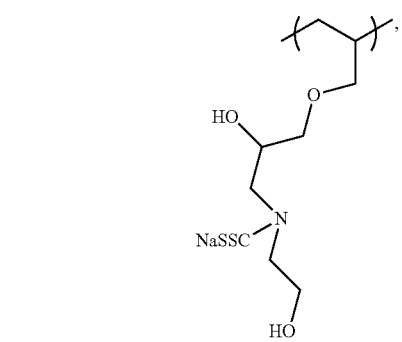

formula 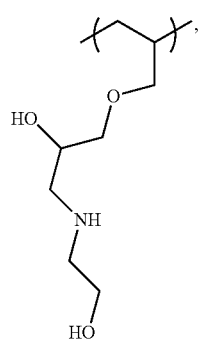

and formula 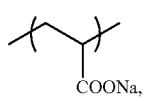

and formula

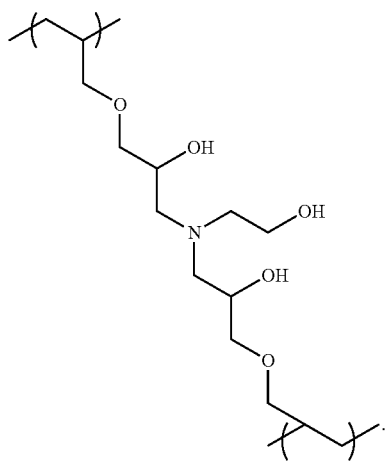

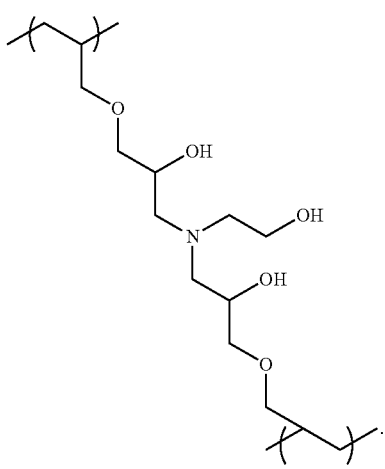

Example 23

To a 50 mL three neck round bottom flask equipped with a thermometer, a nitrogen inlet and addition inlet was charged 11 g of deionized water and 4 g solution prepared from example 17. Then the pH of solution was adjusted to ~5.0 with hydrochloric acid. While sparging with nitrogen, the solution was heated to 80° C. Then the solution of acrylic acid (3.33 g, 46 mmol) was fed to the flask by peristalic pump over 120 minutes. The solution of sodium persulfate (0.472 g, 1.98 mmol, 3%) was simultaneously fed over 145 minutes. Upon completion of all the additions, the reactor contents were heated to 90° C. for 90 minutes. The reaction was then cooled to room temperature. The structure of the resulting polymer was verified by $^1$H NMR as evidenced by the peaks between the region of 1 ppm-4.5 ppm, $^1$H NMR ($\delta$, $D_2O$) 1.14-1.78 (br, 3.12; H), 2.24 (br, 1H), 2.94 (br, 0.77H), 3.07 (br, 1.26H), 3.33-4.0 (br, 4.2H) and comprises structural units of formula Example 24

To a 100 mL three neck round bottom flask equipped with a thermometer, a nitrogen inlet and addition inlet was charged 46 g polymer solution prepared from example 23. Then 12.2 g solution of sodium hydroxide (3.7 g, 93 mmol) was added into the polymer solution under ice water bath. The nitrogen sparge was then switched to nitrogen blank and carbon disulfide (2.46 g, 32 mmol) was charged dropwise over a 15 minutes period with ice water cooling. After addition, the batch was mixed 1 hour with cooling, then was allowed to gradually warm to room temperature. Any residual carbon disulfide was then removed from the product by sparging with nitrogen. The structure of the resulting polymer was verified by $^{13}$C NMR as evidenced by the peaks between the region of 180 ppm-220 ppm, $^{13}$C NMR ($\delta$, $D_2O$) 185 (br), 211 (br) and comprises structural units of formula formula

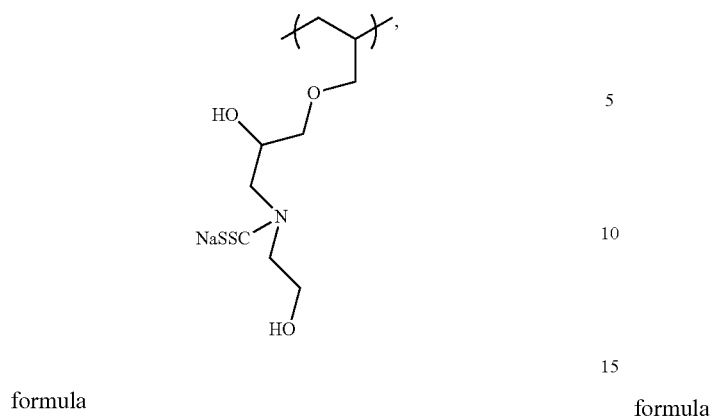

and formula

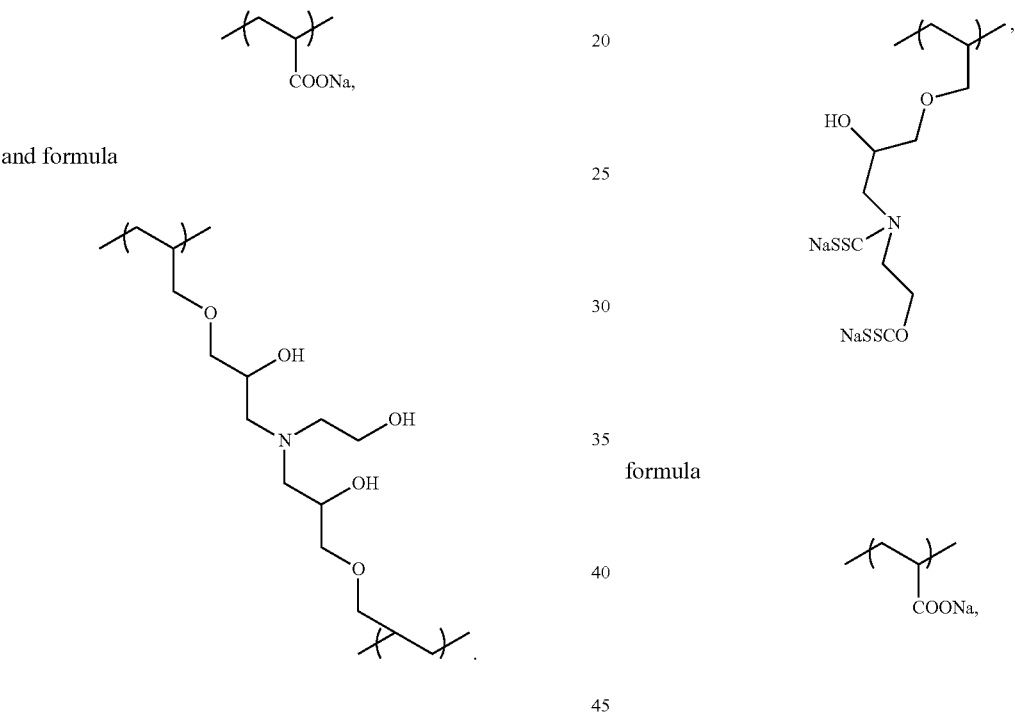

Example 25

To a 50 mL three neck round bottom flask equipped with a thermometer, a nitrogen inlet and addition inlet was charged 22 g polymer solution prepared from example 23. Then 0.47 g sodium hydroxide was added into the polymer solution under ice water bath. The nitrogen sparge was then switched to nitrogen blank and carbon disulfide (0.63 g, 8.3 mmol) was charged dropwise over a 15 minutes period with ice water cooling. After addition, the batch was mixed 1 hour with cooling, then was allowed to gradually warm to room temperature. Any residual carbon disulfide was then removed from the product by sparging with nitrogen. The weight concentration of the reaction mixture in the resulting solution was 22.8%. The structure of the resulting polymer was verified by $^{13}C$ NMR as evidenced by the peaks between the region of 160 ppm-220 ppm, $^{13}C$ NMR (δ, $D_2O$), 185 (br), 197 (br), 211 (br), and comprises structural units of formula formula

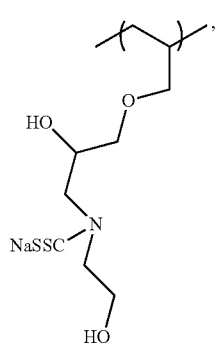

formula

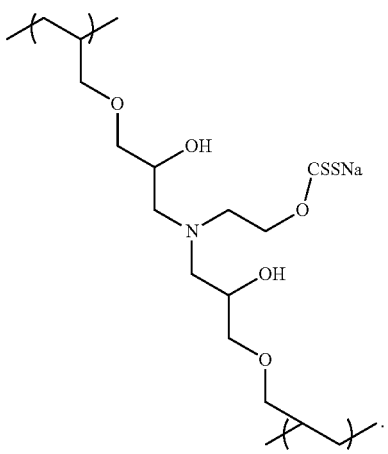

and formula

Example 26

To a 1000 mL three neck round bottom flask equipped with a thermometer, a nitrogen inlet and addition inlet was charged 108.36 g of deionized water and 61.67 g solution prepared from example 19. Then the pH of solution was adjusted to ~3.54 with hydrochloric acid (35.28 g, 37%). While sparging with nitrogen, the solution was heated to 80° C. Then 112.42 g solution of acrylic acid (55.38 g, 0.77 mol) was fed to the flask by peristalic pump over 6 hours. The solution (108.59 g) of sodium persulfate (8.342 g, 35 mmol, 3 mol %) was simultaneously fed over 6.25 hours. Upon completion of all the additions, the reactor contents were heated to 85° C. for 60 minutes. The reaction was then cooled to room temperature, 577.1 g solution prepared. The structure of the resulting polymer was verified by $^1$H NMR as evidenced by the peaks between the region of 1 ppm-4.5 ppm, $^1$H NMR (δ, D$_2$O) 1.14-1.94 (br, 3.24H), 2.29 (br, 1H), 2.98 (br, 0.50H), 3.10 (br, 1.34H), 3.36-4.0 (br, 3.66H) and comprises structural units of formula

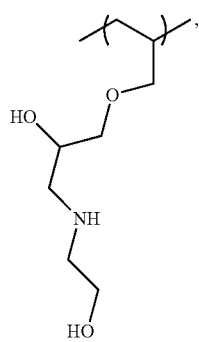

formula

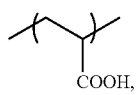

and formula

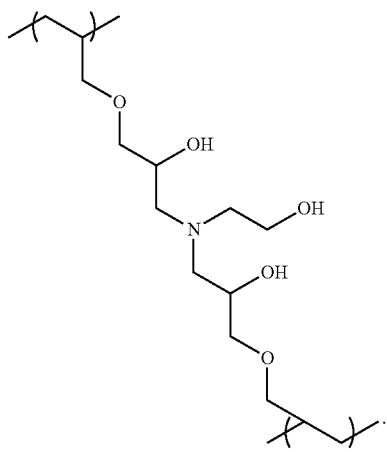

Example 27

To a 250 mL three neck round bottom flask equipped with a thermometer, a nitrogen inlet and addition inlet was charged 10 g polymer solution prepared from example 26. Then 1.577 g solution of sodium hydroxide (0.8 g, 20 mmol) was added into the polymer solution under ice water bath. The nitrogen sparge was then switched to nitrogen blank and carbon disulfide (1.357 g, 17.9 mmol) was charged dropwise over a 15 minutes period with ice water cooling. After addition, the batch was mixed 1 hour with cooling, then was allowed to gradually warm to room temperature. Any residual carbon disulfide was then removed from the product by sparging with nitrogen. The structure of the resulting polymer was verified by $^{13}$C NMR as evidenced by the peaks between the region of 160 ppm-220 ppm, $^{13}$C NMR (δ, D$_2$O) 185 (br), 198 (br), 211 (br) and comprises structural units of formula

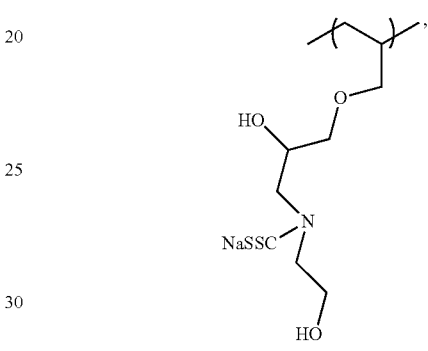

formula

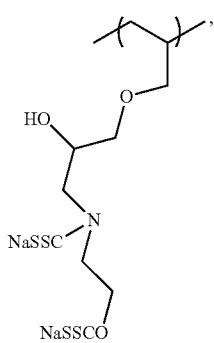

formula

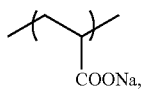

and formula

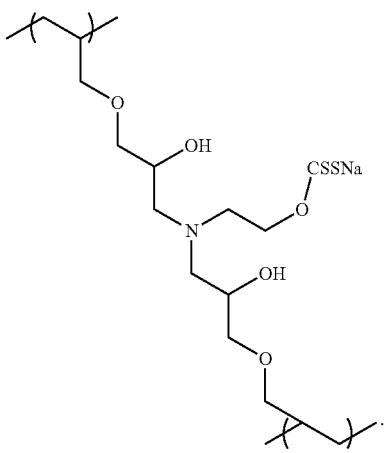

Example 28

To a 50 mL three neck round bottom flask equipped with a thermometer, a nitrogen inlet and addition inlet was charged 7 g of deionized water, 5 g of isopropanol and 4 g solution prepared from example 20. Then the pH of solution was adjusted to ~5.0 with hydrochloric acid. While sparging with nitrogen, the solution was heated to 80° C. Then the solution of acrylic acid (3.33 g, 46 mmol) was fed to the flask by peristalic pump over 120 minutes. The solution of sodium persulfate (0.472 g, 1.98 mmol, 3%) was simultaneously fed over 145 minutes. Upon completion of all the additions, the reactor contents were heated to 90° C. for 90 minutes. The reaction was then cooled to room temperature. The structure of the resulting polymer was verified by $^1$H NMR as evidenced by the peaks between the region of 1 ppm-4.5 ppm, $^1$H NMR ($\delta$, $D_2O$) 1.14-1.78 (br, 3.12; H), 2.24 (br, 1H), 2.94 (br, 0.77H), 3.07 (br, 1.26H), 3.33-4.0 (br, 4.2H) and comprises structural units of formula

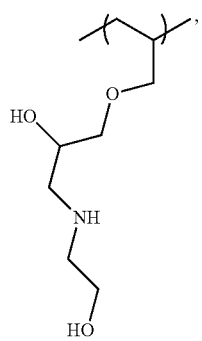

formula

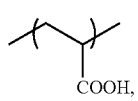

and formula

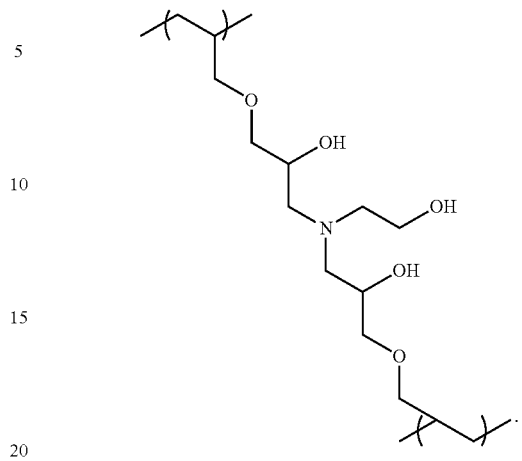

Example 29

Removal Tests

In this experiment, the apparatuses include beakers (5 L or 500 ml), a Phipps and Bird™ jar tester with six standard paddles, a pH meter, plastic syringes, 0.45 micron filters and glass sample bottles.

In each of the experiments, 9 atomic absorption Spectrometer (AA)/Inductive Coupled Plasma-mass Spectrometer (ICP) single element standard solutions respectively comprising Cd, Cr, Cu, Se, Pb, Ni, B, Co, and Zn were added into deionized water in a plastic beaker (5 L) to prepare 3 L of a stock solution.

The pH of the stock solution was adjusted to specified values. A sample of the stock solution (5 ml) was taken for an ICP analysis using an ICP-OES (Inductively coupled plasma optical emission spectrometry) analyzer (Spectro Ciros, Spectro Analytical Instruments GmbH, Cleves, Germany). The stock solution was added into six clean 500 ml beakers respectively (400 ml/beaker) in the jar tester. A given amount of the polymer was added into the beaker so that the concentration of the polymer in the solution was 9 ppm, 45 ppm, 90 ppm, 180 ppm, 450 ppm or 900 ppm as shown in tables below. In some experiments, $Ca^{2+}$ (in the form of $CaCl_2$ aqueous solution) was also added into the solutions. The polymer/$Ca^{2+}$ dosage was calculated based on weight concentration of polymer/$Ca^{2+}$ in the solution, i.e., 1 ppm means 1 mg of polymer/$Ca^{2+}$ were dosed into 1 L of stock solution. The obtained mixture was stirred at 100 rpm for 2 minutes, at 35 rpm for 5 minutes, and left settling for 5 minutes.

A sample (5 ml) of the supernate in the beaker was taken after settling for an ICP analysis. Another sample (5 ml) of the supernate was taken from the beaker to be filtered through a 0.45 micron filter. An ICP analysis of the filtrate was conducted.

The reduction rate was calculated by this formula: reduction rate (%)=(concentration in the stock solution−concentration in the supernate or filtrate)/concentration in the stock solution×100.

Tables 2-5 illustrate results of the polymer obtained in Example 9.

TABLE 2

| sample | concentration of polymer | element | Cr | Cu | Zn | Pb | Co | Cd | Ni | Se |
|---|---|---|---|---|---|---|---|---|---|---|
| stock solution (pH = 9.28) | 0 | concentration (ppm) | 1.14 | 1.03 | 1.08 | 0.67 | 1.14 | 0.75 | 1.19 | 1.28 |
| supernate | 9 ppm | concentration (ppm) | 1.04 | 0.56 | 0.61 | 0.33 | 0.66 | 0.44 | 0.67 | 1.06 |
| | | reduction rate (%) | 8.80 | 45.71 | 43.67 | 50.83 | 42.33 | 41.59 | 43.53 | 17.37 |
| supernate | 45 ppm | concentration (ppm) | 1.06 | 0.51 | 0.55 | 0.53 | 0.58 | 0.64 | 0.60 | 1.00 |
| | | reduction rate (%) | 7.28 | 50.26 | 48.82 | 20.92 | 49.64 | 14.62 | 49.93 | 21.67 |
| supernate | 90 ppm | concentration (ppm) | 1.07 | 0.48 | 0.53 | 0.68 | 0.53 | 0.66 | 0.56 | 0.99 |
| | | reduction rate (%) | 6.13 | 52.91 | 51.38 | −1.12 | 53.22 | 11.84 | 52.97 | 22.93 |
| supernate | 180 ppm | concentration (ppm) | 1.08 | 0.43 | 0.47 | 0.71 | 0.46 | 0.65 | 0.48 | 1.02 |
| | | reduction rate (%) | 5.76 | 58.06 | 56.49 | −6.71 | 60.09 | 12.40 | 59.56 | 20.62 |
| supernate | 450 ppm | concentration (ppm) | 1.12 | 0.65 | 0.68 | 0.86 | 0.60 | 0.83 | 0.74 | 1.04 |
| | | reduction rate (%) | 2.08 | 36.93 | 37.60 | −28.93 | 47.07 | −11.70 | 38.04 | 18.99 |
| supernate | 900 ppm | concentration (ppm) | 1.12 | 0.16 | 0.71 | 0.94 | 0.36 | 0.86 | 0.67 | 0.79 |
| | | reduction rate (%) | 1.99 | 84.57 | 34.38 | −41.03 | 68.57 | −14.53 | 43.63 | 38.22 |

TABLE 3 removal performance of the polymer obtained in Example 9, after filtration

| sample | concentration of polymer | element | Cr | Cu | Zn | Pb | Co | Cd | Ni | Se |
|---|---|---|---|---|---|---|---|---|---|---|
| stock solution (pH = 9.28) | 0 | concentration (ppm) | 1.14 | 1.03 | 1.08 | 0.67 | 1.14 | 0.75 | 1.19 | 1.28 |
| filtrate | 9 ppm | concentration (ppm) | 0.96 | 0.02 | 0.02 | 0.10 | 0.02 | 0.21 | 0.02 | 0.76 |
| | | reduction rate (%) | 15.79 | 98.29 | 98.15 | 85.56 | 98.25 | 71.93 | 98.32 | 40.71 |
| filtrate | 45 ppm | concentration (ppm) | 1.01 | 0.03 | 0.04 | 0.46 | 0.02 | 0.33 | 0.02 | 0.82 |
| | | reduction rate (%) | 11.57 | 97.34 | 96.50 | 31.79 | 98.25 | 55.46 | 98.68 | 36.35 |
| filtrate | 90 ppm | concentration (ppm) | 1.03 | 0.04 | 0.05 | 0.53 | 0.03 | 0.39 | 0.03 | 0.91 |
| | | reduction rate (%) | 9.96 | 95.83 | 95.06 | 21.05 | 97.65 | 48.05 | 97.31 | 28.73 |
| filtrate | 180 ppm | concentration (ppm) | 1.05 | 0.08 | 0.07 | 0.53 | 0.04 | 0.45 | 0.05 | 0.91 |
| | | reduction rate (%) | 8.31 | 92.57 | 93.19 | 21.53 | 96.18 | 40.21 | 95.52 | 28.69 |
| filtrate | 450 ppm | concentration (ppm) | 1.08 | 0.16 | 0.12 | 0.58 | 0.09 | 0.56 | 0.15 | 0.88 |
| | | reduction rate (%) | 5.52 | 84.39 | 88.90 | 13.74 | 91.70 | 24.66 | 87.31 | 31.19 |
| filtrate | 900 ppm | concentration (ppm) | 1.10 | 0.07 | 0.23 | 0.69 | 0.11 | 0.69 | 0.23 | 0.68 |
| | | reduction rate (%) | 3.27 | 93.00 | 78.32 | −3.75 | 90.12 | 7.41 | 80.50 | 46.85 |

TABLE 4 removal performance of the polymer obtained in Example 9 with the presence of 200 ppm $Ca^{2+}$, before filtration

| sample | concentration of polymer | element | Cr | Cu | Zn | Pb | Co | Cd | Ni | Se |
|---|---|---|---|---|---|---|---|---|---|---|
| stock solution (pH = 9.14) | 0 | concentration (ppm) | 1.15 | 1.32 | 1.22 | 0.84 | 1.26 | 0.95 | 1.29 | 1.35 |
| supernate | 9 ppm | concentration (ppm) | 1.04 | 0.82 | 0.77 | 0.47 | 0.81 | 0.67 | 0.83 | 1.09 |
| | | reduction rate (%) | 10.10 | 37.35 | 37.09 | 44.19 | 35.54 | 30.26 | 35.93 | 19.50 |
| supernate | 45 ppm | concentration (ppm) | 1.08 | 1.00 | 0.94 | 0.68 | 0.98 | 0.81 | 0.99 | 1.13 |
| | | reduction rate (%) | 6.33 | 23.93 | 22.71 | 18.65 | 22.46 | 14.93 | 23.29 | 16.05 |
| supernate | 90 ppm | concentration (ppm) | 1.05 | 0.94 | 0.85 | 0.71 | 0.86 | 0.81 | 0.89 | 1.15 |
| | | reduction rate (%) | 8.65 | 28.41 | 30.45 | 15.63 | 31.88 | 14.99 | 31.20 | 14.86 |
| supernate | 180 ppm | concentration (ppm) | 0.98 | 0.69 | 0.66 | 0.68 | 0.63 | 0.69 | 0.67 | 1.04 |
| | | reduction rate (%) | 14.97 | 47.39 | 45.88 | 19.46 | 49.76 | 27.63 | 48.20 | 22.82 |
| supernate | 450 ppm | concentration (ppm) | 1.03 | 0.69 | 0.62 | 0.69 | 0.55 | 0.71 | 0.61 | 1.01 |
| | | reduction rate (%) | 10.91 | 47.37 | 49.27 | 18.13 | 56.45 | 25.75 | 52.96 | 25.22 |
| supernate | 900 ppm | concentration (ppm) | 0.99 | 0.17 | 0.42 | 0.64 | 0.30 | 0.68 | 0.34 | 0.81 |
| | | reduction rate (%) | 14.09 | 86.71 | 65.11 | 24.29 | 76.35 | 28.30 | 73.90 | 40.39 |

TABLE 5 removal performance of the polymer obtained in Example 9 with the presence of 200 ppm $Ca^{2+}$, after filtration

| sample | concentration of polymer | element | Cr | Cu | Zn | Pb | Co | Cd | Ni | Se |
|---|---|---|---|---|---|---|---|---|---|---|
| stock solution (pH = 9.14) | 0 | concentration (ppm) | 1.15 | 1.32 | 1.22 | 0.84 | 1.26 | 0.95 | 1.29 | 1.35 |
| filtrate | 9 ppm | concentration (ppm) | 0.86 | 0.02 | 0.02 | 0.05 | 0.02 | 0.25 | 0.02 | 0.76 |
| | | reduction rate (%) | 25.29 | 98.48 | 98.36 | 94.06 | 98.61 | 73.74 | 98.45 | 43.90 |
| filtrate | 45 ppm | concentration (ppm) | 0.91 | 0.02 | 0.02 | 0.09 | 0.02 | 0.16 | 0.03 | 0.82 |
| | | reduction rate (%) | 21.35 | 98.48 | 98.36 | 89.20 | 98.41 | 83.03 | 97.40 | 39.40 |
| filtrate | 90 ppm | concentration (ppm) | 0.95 | 0.02 | 0.02 | 0.12 | 0.02 | 0.15 | 0.02 | 0.89 |
| | | reduction rate (%) | 17.16 | 98.48 | 98.70 | 85.81 | 98.41 | 83.91 | 98.45 | 34.11 |
| filtrate | 180 ppm | concentration (ppm) | 0.99 | 0.02 | 0.02 | 0.13 | 0.02 | 0.16 | 0.02 | 0.95 |
| | | reduction rate (%) | 14.44 | 98.44 | 98.43 | 84.77 | 98.68 | 83.03 | 98.45 | 29.48 |
| filtrate | 450 ppm | concentration (ppm) | 1.04 | 0.45 | 0.39 | 0.50 | 0.34 | 0.53 | 0.38 | 1.01 |
| | | reduction rate (%) | 9.95 | 65.58 | 68.35 | 40.29 | 73.37 | 44.29 | 70.91 | 24.94 |
| filtrate | 900 ppm | concentration (ppm) | 0.99 | 0.11 | 0.10 | 0.38 | 0.04 | 0.45 | 0.05 | 0.79 |
| | | reduction rate (%) | 13.88 | 91.28 | 91.89 | 55.34 | 97.07 | 53.04 | 96.20 | 41.41 |

Tables 6-1, 6-2, 7-1, 7-2, 8-1 and 8-2 illustrate results of the polymer obtained in example 11.

Table 6: removal performance of the polymer obtained in example 11 without/with the presence of $Ca^{2+}$ in the solution, before filtration

TABLE 6-1

| | | | \multicolumn{8}{c}{without $Ca^{2+}$} |
|---|---|---|---|---|---|---|---|---|---|---|
| sample | concentration of polymer | element | Cr | Cu | Zn | Pb | Co | Cd | Ni | Se |
| stock solution (pH = 9.05) | 0 | concentration (ppm) | 1.21 | 1.17 | 1.21 | 0.79 | 1.23 | 0.85 | 1.26 | 1.33 |
| supernate | 9 ppm | concentration (ppm) | 1.12 | 0.88 | 0.88 | 0.72 | 0.88 | 0.98 | 0.90 | 1.12 |
| | | reduction rate (%) | 7.94 | 25.22 | 27.13 | 8.49 | 28.45 | −15.22 | 28.49 | 16.29 |
| supernate | 45 ppm | concentration (ppm) | 1.07 | 0.71 | 0.72 | 0.79 | 0.72 | 0.93 | 0.74 | 1.05 |
| | | reduction rate (%) | 11.47 | 39.49 | 39.96 | 0.48 | 41.19 | −9.34 | 41.59 | 21.53 |
| supernate | 90 ppm | concentration (ppm) | 1.16 | 0.84 | 0.90 | 0.96 | 0.89 | 1.04 | 0.92 | 1.18 |
| | | reduction rate (%) | 4.36 | 27.95 | 25.22 | −21.23 | 27.48 | −22.21 | 27.31 | 11.70 |

TABLE 6-2

| | | | | \multicolumn{8}{c}{with $Ca^{2+}$} |
|---|---|---|---|---|---|---|---|---|---|---|---|
| sample | concentration of polymer | concentration of $Ca^{2+}$ | element | Cr | Cu | Zn | Pb | Co | Cd | Ni | Se |
| stock solution (pH = 9.0) | 0 | 211.13 ppm | concentration (ppm) | 1.24 | 1.36 | 1.31 | 0.9 | 1.34 | 1.06 | 1.37 | 1.35 |
| supernate | 9 ppm | 205.02 ppm | concentration (ppm) | 1.12 | 1.01 | 0.99 | 0.75 | 1.01 | 1.02 | 1.03 | 1.2 |
| | | | reduction rate (%) | 9.79 | 25.36 | 24.2 | 16.55 | 24.82 | 3.88 | 24.56 | 11.36 |
| supernate | 45 ppm | 206.96 ppm | concentration (ppm) | 1.03 | 0.8 | 0.79 | 0.86 | 0.76 | 0.88 | 0.8 | 1.14 |
| | | | reduction rate (%) | 17.61 | 41.41 | 39.14 | 4.13 | 43.03 | 17.25 | 41.78 | 15.32 |
| supernate | 90 ppm | 208.69 ppm | concentration (ppm) | 1.03 | 1.08 | 1.08 | 1.04 | 0.99 | 1.06 | 1.08 | 1.19 |
| | | | reduction rate (%) | 17.41 | 20.48 | 17.04 | −15.12 | 25.85 | 0.25 | 20.88 | 11.76 |

Table 7: removal performance of the polymer obtained in example 11 without/with the presence of $Ca^{2+}$ in the solution, after filtration

TABLE 7-1

| | | | \multicolumn{8}{c}{without $Ca^{2+}$} |
|---|---|---|---|---|---|---|---|---|---|---|
| sample | concentration of polymer | element | Cr | Cu | Zn | Pb | Co | Cd | Ni | Se |
| stock solution (pH = 9.05) | 0 | concentration (ppm) | 1.21 | 1.17 | 1.21 | 0.79 | 1.23 | 0.85 | 1.26 | 1.33 |
| filtrate | 9 ppm | concentration (ppm) | 1.01 | 0.19 | 0.84 | 0.31 | 0.20 | 0.71 | 0.20 | 0.76 |
| | | reduction rate (%) | 16.29 | 84.11 | 30.56 | 60.77 | 83.64 | 17.16 | 84.21 | 42.82 |
| filtrate | 45 ppm | concentration (ppm) | 1.00 | 0.05 | 0.36 | 0.38 | 0.09 | 0.65 | 0.08 | 0.70 |
| | | reduction rate (%) | 17.55 | 95.74 | 70.23 | 51.35 | 92.95 | 23.60 | 93.85 | 47.64 |
| filtrate | 90 ppm | concentration (ppm) | 1.09 | 0.10 | 0.44 | 0.48 | 0.15 | 0.72 | 0.14 | 0.85 |

TABLE 7-1-continued

| | | | without $Ca^{2+}$ | | | | | | | |
|---|---|---|---|---|---|---|---|---|---|---|
| sample | concentration of polymer | element | Cr | Cu | Zn | Pb | Co | Cd | Ni | Se |
| | | reduction rate (%) | 10.09 | 91.25 | 63.15 | 39.78 | 88.15 | 15.23 | 89.16 | 35.89 |

TABLE 7-2

| | | | with $Ca^{2+}$ | | | | | | | |
|---|---|---|---|---|---|---|---|---|---|---|
| sample | concentration of polymer | concentration of $Ca^{2+}$ | element | Cr | Cu | Zn | Pb | Co | Cd | Ni | Se |
| stock solution (pH = 9.0) | 0 | 211.13 ppm | concentration (ppm) | 1.24 | 1.36 | 1.31 | 0.9 | 1.34 | 1.06 | 1.37 | 1.35 |
| filtrate | 9 ppm | 204.46 ppm | concentration (ppm) | 0.91 | 0.03 | 0.03 | 0.05 | 0.03 | 0.11 | 0.03 | 0.75 |
| | | | reduction rate (%) | 26.54 | 98.15 | 97.57 | 94.44 | 97.57 | 89.86 | 98.16 | 44.22 |
| filtrate | 45 ppm | 208.32 ppm | concentration (ppm) | 1.00 | 0.02 | 0.02 | 0.05 | 0.02 | 0.04 | 0.01 | 0.93 |
| | | | reduction rate (%) | 19.67 | 98.54 | 98.26 | 94.44 | 98.51 | 95.87 | 99.49 | 31.03 |
| filtrate | 90 ppm | 206.65 ppm | concentration (ppm) | 0.95 | 0.04 | 0.13 | 0.15 | 0.03 | 0.27 | 0.02 | 0.90 |
| | | | reduction rate (%) | 23.61 | 96.95 | 89.89 | 82.97 | 98.02 | 74.49 | 98.29 | 33.05 |

Tables 8-1 and 8-2 illustrate the removal performance results of the polymer obtained in example 11 with/without the presence of $Ca^{2+}$ in the solution, after filtration.

TABLE 8-1

| | | | without $Ca^{2+}$ | | | | | | |
|---|---|---|---|---|---|---|---|---|---|
| sample | concentration of polymer | element | Cr | Cu | Zn | Pb | Co | Cd | Ni |
| stock solution (pH = 7) | 0 | concentration (ppm) | 1.07 | 1.27 | 0.86 | 1.12 | 1.15 | 0.96 | 1.61 |
| filtrate | 9 ppm | concentration (ppm) | 0.9 | 0.57 | 0.79 | 0.16 | 1.06 | 0.92 | 1.5 |
| | | reduction rate (%) | 15.59 | 55.23 | 7.57 | 85.75 | 8.08 | 4.79 | 6.64 |
| filtrate | 45 ppm | concentration (ppm) | 0.96 | 0.64 | 1.1 | 0.49 | 1.01 | 0.92 | 1.45 |
| | | reduction rate (%) | 10.21 | 49.53 | −28.43 | 55.71 | 12.23 | 4.27 | 9.53 |
| filtrate | 90 ppm | concentration (ppm) | 1 | 0.68 | 0.99 | 0.77 | 0.97 | 0.94 | 1.48 |
| | | reduction rate (%) | 6.23 | 46.69 | −15.19 | 31.26 | 16.24 | 2.27 | 7.74 |

TABLE 8-2

| | | | with $Ca^{2+}$ | | | | | | |
|---|---|---|---|---|---|---|---|---|---|
| sample | concentration of polymer | concentration of $Ca^{2+}$ | element | Cr | Cu | Zn | Pb | Co | Cd | Ni |
| stock solution (pH = 7) | 0 | 204.3 ppm | concentration (ppm) | 1.12 | 1.44 | 1.17 | 1.34 | 1.28 | 1.24 | 1.22 |
| filtrate | 9 ppm | 207.2 ppm | concentration (ppm) | 0.95 | 0.27 | 1.3 | 0.28 | 1.04 | 0.96 | 1.02 |
| | | | reduction rate (%) | 15.35 | 81.01 | −10.67 | 79.17 | 18.81 | 22.09 | 16.15 |

TABLE 8-2-continued with $Ca^{2+}$

| sample | concentration of polymer | concentration of $Ca^{2+}$ | element | Cr | Cu | Zn | Pb | Co | Cd | Ni |
|---|---|---|---|---|---|---|---|---|---|---|
| filtrate | 45 ppm | 201.7 ppm | concentration (ppm) | 0.8 | 0.3 | 0.84 | 0.29 | 0.66 | 0.42 | 0.64 |
|  |  |  | reduction rate (%) | 28.68 | 78.86 | 28.05 | 78.23 | 48.24 | 66.22 | 47.18 |
| filtrate | 90 ppm | 198.3 ppm | concentration (ppm) | 0.9 | 0.24 | 0.75 | 0.24 | 0.32 | 0.4 | 0.38 |
|  |  |  | reduction rate (%) | 20.17 | 83.14 | 35.79 | 81.99 | 75.32 | 67.83 | 69.18 |

From the results, it can be seen that at pH 7, the reduction rates were not as high as at pH 9, but when there were $Ca^{2+}$ in the solution, the reduction rates were significantly higher than those where there were not $Ca^{2+}$ in the solution.

Tables 9 and 10 illustrate results of the polymer obtained in example 13.

TABLE 9 removal performance of the polymer obtained in example 13 without $Ca^{2+}$ in the solution, after filtration

| sample | concentration of polymer | element | Cr | Cu | Zn | Pb | Co | Cd | Ni | Se |
|---|---|---|---|---|---|---|---|---|---|---|
| stock solution (pH = 9.2) | 0 | concentration (ppm) | 1.13 | 1.03 | 1.03 | 0.56 | 1.09 | 0.69 | 1.13 | 1.25 |
| filtrate | 9 ppm | concentration (ppm) | 1.01 | 0.06 | 0.32 | 0.23 | 0.03 | 0.42 | 0.10 | 0.83 |
|  |  | reduction rate (%) | 10.02 | 93.82 | 68.42 | 59.17 | 96.94 | 39.59 | 91.15 | 33.58 |
| filtrate | 45 ppm | concentration (ppm) | 1.05 | 0.07 | 0.48 | 0.25 | 0.05 | 0.39 | 0.10 | 0.89 |
|  |  | reduction rate (%) | 7.21 | 92.74 | 53.50 | 55.74 | 95.52 | 43.94 | 91.15 | 28.69 |
| filtrate | 90 ppm | concentration (ppm) | 1.06 | 0.11 | 0.65 | 0.27 | 0.09 | 0.38 | 0.10 | 0.88 |
|  |  | reduction rate (%) | 5.62 | 88.85 | 36.37 | 51.95 | 92.06 | 45.68 | 90.76 | 29.55 |

TABLE 10 removal performance of the polymer obtained in example 13 with 200 ppm $Ca^{2+}$ in the solution, after filtration

| sample | concentration of polymer | element | Cr | Cu | Zn | Pb | Co | Cd | Ni | Se |
|---|---|---|---|---|---|---|---|---|---|---|
| stock solution (pH = 9.2) | 0 | concentration (ppm) | 1.07 | 0.92 | 0.88 | 0.52 | 0.92 | 0.80 | 0.96 | 1.14 |
| filtrate | 9 ppm | concentration (ppm) | 0.95 | 0.03 | 0.04 | 0.05 | 0.02 | 0.09 | 0.10 | 0.87 |
|  |  | reduction rate (%) | 11.78 | 97.25 | 95.08 | 91.33 | 97.82 | 88.38 | 89.58 | 23.93 |
| filtrate | 45 ppm | concentration (ppm) | 1.01 | 0.04 | 0.17 | 0.11 | 0.02 | 0.18 | 0.10 | 0.98 |
|  |  | reduction rate (%) | 5.92 | 96.15 | 80.27 | 79.58 | 97.82 | 77.13 | 89.58 | 14.16 |
| filtrate | 90 ppm | concentration (ppm) | 1.00 | 0.04 | 0.04 | 0.12 | 0.02 | 0.15 | 0.10 | 0.96 |
|  |  | reduction rate (%) | 6.92 | 95.92 | 95.52 | 77.31 | 97.33 | 81.76 | 89.58 | 16.07 |

Table 10 illustrates result of the polymer obtained in example 14 with different concentrations of $Ca^{2+}$ in the solutions.

TABLE 11 removal results of the polymer obtained in example 14, after filtration

| concentration of $Ca^{2+}$ | concentration of polymer | sample | element | Cr | Cu | Zn | Pb | Co | Cd | Ni |
|---|---|---|---|---|---|---|---|---|---|---|
| 0 | 0 | stock solution (pH = 9) | concentration (ppm) | 1.17 | 1.29 | 1.13 | 1.11 | 1.13 | 0.99 | 1.12 |
| 0 | 45 ppm | filtrate | concentration (ppm) | 1.10 | 0.28 | 0.42 | 0.71 | 0.33 | 0.82 | 0.33 |
| | | | reduction rate (%) | 5.55 | 78.29 | 62.71 | 35.79 | 70.90 | 17.08 | 70.80 |
| 92.72 ppm | | filtrate | concentration (ppm) | 1.03 | 0.24 | 0.62 | 0.37 | 0.19 | 0.48 | 0.17 |
| | | | reduction rate (%) | 12.13 | 81.75 | 45.57 | 66.84 | 83.37 | 51.63 | 85.00 |
| 201.47 ppm | | filtrate | concentration (ppm) | 1.02 | 0.16 | 0.45 | 0.28 | 0.15 | 0.35 | 0.12 |
| | | | reduction rate (%) | 12.88 | 87.51 | 60.49 | 75.00 | 87.14 | 64.36 | 88.91 |
| 532.09 ppm | | filtrate | concentration (ppm) | 0.98 | 0.06 | 0.11 | 0.14 | 0.10 | 0.20 | 0.07 |
| | | | reduction rate (%) | 15.80 | 95.18 | 90.34 | 87.61 | 91.08 | 79.91 | 93.42 |

It can be seen that the reduction rates of elements increased when the concentrations of $Ca^{2+}$ in the solutions were increased.

TABLE 12 removal results of the polymer obtained in example 22 without $Ca^{2+}$, after filtration

| sample | concentration of polymer | element | Cr | Cu | Zn | Pb | Co | Cd | Ni | Se |
|---|---|---|---|---|---|---|---|---|---|---|
| stock solution (pH = 9.01) | 0 | concentration (ppm) | 1.01 | 0.97 | 1.06 | 0.80 | 1.04 | 1.01 | 1.01 | 1.15 |
| filtrate | 9 ppm | concentration (ppm) | 0.93 | 0.10 | 0.23 | 0.28 | 0.50 | 0.81 | 0.47 | 0.75 |
| | | reduction rate (%) | 7.92 | 89.18 | 78.64 | 64.78 | 52.20 | 20.13 | 53.10 | 34.78 |
| filtrate | 45 ppm | concentration (ppm) | 1.05 | 0.43 | 0.45 | 0.94 | 0.64 | 0.93 | 0.64 | 1.03 |
| | | reduction rate (%) | −3.96 | 55.23 | 57.42 | −17.13 | 38.29 | 8.47 | 35.87 | 10.43 |
| filtrate | 90 ppm | concentration (ppm) | 1.01 | 0.69 | 0.57 | 0.87 | 0.72 | 0.83 | 0.78 | 1.05 |
| | | reduction rate (%) | 0 | 29.02 | 46.60 | −8.21 | 31.33 | 17.44 | 22.54 | 8.70 |

TABLE 13 removal results of the polymer obtained in example 22 with 220 ppm $Ca^{2+}$ in the solution, after filtration

| sample | concentration of polymer | element | Cr | Cu | Zn | Pb | Co | Cd | Ni | Se |
|---|---|---|---|---|---|---|---|---|---|---|
| stock solution (pH = 9.00) | 0 | concentration (ppm) | 1.07 | 1.01 | 1.05 | 0.97 | 1.05 | 1.04 | 0.97 | 1.22 |
| filtrate | 9 ppm | concentration (ppm) | 0.84 | 0.02 | 0.11 | 0.05 | 0.40 | 0.56 | 0.31 | 0.66 |
| | | reduction rate (%) | 21.50 | 98.02 | 89.86 | 94.53 | 62.28 | 45.75 | 68.11 | 45.90 |
| filtrate | 45 ppm | concentration (ppm) | 0.88 | 0.02 | 0.06 | 0.06 | 0.21 | 0.23 | 0.14 | 0.79 |
| | | reduction rate (%) | 17.76 | 98.02 | 94.52 | 94.30 | 80.39 | 77.73 | 86.08 | 35.25 |
| filtrate | 90 ppm | concentration (ppm) | 0.87 | 0.02 | 0.04 | 0.05 | 0.18 | 0.11 | 0.05 | 0.86 |
| | | reduction rate (%) | 18.69 | 98.02 | 96.02 | 94.85 | 82.79 | 89.29 | 94.39 | 29.51 |

TABLE 14 removal results of the polymer obtained in example 24 without Ca$^{2+}$ added in the solution, after filtration

| sample | concentration of polymer | element | Cr | Cu | Zn | Pb | Co | Cd | Ni | Se |
|---|---|---|---|---|---|---|---|---|---|---|
| stock solution (pH = 9.05) | 0 | concentration (ppm) | 1.07 | 1.14 | 1.06 | 1.09 | 1.06 | 1.03 | 1.04 | 1.11 |
| filtrate | 9 ppm | concentration (ppm) | 0.90 | 0.05 | 0.32 | 0.26 | 0.55 | 0.83 | 0.56 | 0.64 |
| | | reduction rate (%) | 15.89 | 95.61 | 69.81 | 76.15 | 48.11 | 19.42 | 46.15 | 42.34 |
| filtrate | 45 ppm | concentration (ppm) | 1.01 | 0.21 | 0.47 | 0.69 | 0.57 | 0.85 | 0.71 | 0.90 |
| | | reduction rate (%) | 5.61 | 81.58 | 55.66 | 36.70 | 46.23 | 17.48 | 31.73 | 18.92 |
| filtrate | 90 ppm | concentration (ppm) | 0.87 | 0.41 | 0.50 | 0.54 | 0.44 | 0.81 | 0.87 | 0.57 |
| | | reduction rate (%) | 18.69 | 64.04 | 52.83 | 50.46 | 58.49 | 21.36 | 16.35 | 48.65 |

TABLE 15 removal results of the polymer obtained in example 24 with 250 ppm Ca$^{2+}$ added in the solution, after filtration

| sample | concentration of polymer | element | Cr | Cu | Zn | Pb | Co | Cd | Ni | Se |
|---|---|---|---|---|---|---|---|---|---|---|
| stock solution (pH = 9.08) | 0 | concentration (ppm) | 1.06 | 0.99 | 0.90 | 0.98 | 0.93 | 0.90 | 0.87 | 1.10 |
| filtrate | 9 ppm | concentration (ppm) | 0.87 | 0.03 | 0.29 | 0.10 | 0.55 | 0.43 | 0.49 | 0.74 |
| | | reduction rate (%) | 17.92 | 96.97 | 67.78 | 89.80 | 40.86 | 52.22 | 43.68 | 32.73 |
| filtrate | 45 ppm | concentration (ppm) | 0.91 | 0.04 | 0.12 | 0.04 | 0.25 | 0.11 | 0.29 | 0.87 |
| | | reduction rate (%) | 14.15 | 95.96 | 86.67 | 95.92 | 73.12 | 87.78 | 66.67 | 20.91 |
| filtrate | 90 ppm | concentration (ppm) | 0.89 | 0.02 | 0.11 | 0.03 | 0.27 | 0.07 | 0.06 | 0.49 |
| | | reduction rate (%) | 16.04 | 97.98 | 87.78 | 96.94 | 70.97 | 92.22 | 93.10 | 55.45 |

TABLE 16 removal results of the polymer obtained in example 25 without Ca$^{2+}$ added in the solution, after filtration

| sample | concentration of polymer | element | Cr | Cu | Zn | Pb | Co | Cd | Ni | Se |
|---|---|---|---|---|---|---|---|---|---|---|
| stock solution (pH = 9.05) | 0 | concentration (ppm) | 1.07 | 1.14 | 1.06 | 1.09 | 1.06 | 1.03 | 1.04 | 1.11 |
| filtrate | 9 ppm | concentration (ppm) | 0.90 | 0.04 | 0.32 | 0.21 | 0.56 | 0.83 | 0.56 | 0.62 |
| | | reduction rate (%) | 15.89 | 96.49 | 69.81 | 80.73 | 47.17 | 19.42 | 46.15 | 44.14 |
| filtrate | 45 ppm | concentration (ppm) | 0.99 | 0.06 | 0.43 | 0.34 | 0.46 | 0.76 | 0.65 | 0.85 |
| | | reduction rate (%) | 7.48 | 94.74 | 59.43 | 68.81 | 56.60 | 26.21 | 37.50 | 23.42 |
| filtrate | 90 ppm | concentration (ppm) | 0.75 | 0.49 | 0.44 | 0.31 | 0.37 | 0.80 | 0.94 | 0.59 |
| | | reduction rate (%) | 29.91 | 57.02 | 58.49 | 71.56 | 65.09 | 22.33 | 9.62 | 46.85 |

TABLE 17 removal results of the polymer obtained in example 25 with 250 ppm $Ca^{2+}$ added in the solution, after filtration

| sample | concentration of polymer | element | Cr | Cu | Zn | Pb | Co | Cd | Ni | Se |
|---|---|---|---|---|---|---|---|---|---|---|
| stock solution (pH = 9.08) | 0 | concentration (ppm) | 1.05 | 1.10 | 1.05 | 1.08 | 1.01 | 1.00 | 0.97 | 1.11 |
| filtrate | 9 ppm | concentration (ppm) | 0.85 | 0.02 | 0.11 | 0.03 | 0.32 | 0.04 | 0.25 | 0.66 |
|  |  | reduction rate (%) | 19.05 | 98.18 | 89.52 | 97.22 | 68.32 | 96.00 | 74.23 | 40.54 |
| filtrate | 45 ppm | concentration (ppm) | 0.85 | 0.04 | 0.09 | 0.05 | 0.27 | 0.16 | 0.26 | 0.80 |
|  |  | reduction rate (%) | 19.05 | 96.36 | 91.43 | 95.37 | 73.27 | 84.00 | 73.20 | 27.93 |
| filtrate | 90 ppm | concentration (ppm) | 0.71 | 0.02 | 0.09 | 0.03 | 0.30 | 0.13 | 0.10 | 0.25 |
|  |  | reduction rate (%) | 32.38 | 98.18 | 91.43 | 97.22 | 70.30 | 87.00 | 89.69 | 77.48 |

TABLE 18 removal results of the polymer obtained in example 27 without $Ca^{2+}$ added in the solution, after filtration

| sample | concentration of polymer | element | Cr | Cu | Zn | Pb | Co | Cd | Ni | Se |
|---|---|---|---|---|---|---|---|---|---|---|
| stock solution (pH = 9.01) | 0 | concentration (ppm) | 1.00 | 0.96 | 0.99 | 0.93 | 0.97 | 0.99 | 0.91 | 1.12 |
| filtrate | 9 ppm | concentration (ppm) | 0.85 | 0.04 | 0.10 | 0.27 | 0.31 | 0.73 | 0.26 | 0.63 |
|  |  | reduction rate (%) | 15.00 | 95.83 | 89.90 | 70.97 | 68.04 | 26.26 | 71.43 | 43.75 |
| filtrate | 45 ppm | concentration (ppm) | 0.88 | 0.07 | 0.16 | 0.42 | 0.33 | 0.66 | 0.39 | 0.76 |
|  |  | reduction rate (%) | 12.00 | 92.71 | 83.84 | 54.84 | 65.98 | 33.33 | 57.14 | 32.14 |
| filtrate | 90 ppm | concentration (ppm) | 0.88 | 0.17 | 0.22 | 0.35 | 0.43 | 0.67 | 0.58 | 0.75 |
|  |  | reduction rate (%) | 12.00 | 82.29 | 77.78 | 62.37 | 55.67 | 32.32 | 36.26 | 33.04 |

TABLE 19 removal results of the polymer obtained in example 27 with 250 ppm $Ca^{2+}$ added in the solution, after filtration

| sample | concentration of polymer | element | Cr | Cu | Zn | Pb | Co | Cd | Ni | Se |
|---|---|---|---|---|---|---|---|---|---|---|
| stock solution (pH = 8.99) | 0 | concentration (ppm) | 1.02 | 1.05 | 1.00 | 0.99 | 1.00 | 0.95 | 0.95 | 1.13 |
| filtrate | 9 ppm | concentration (ppm) | 0.81 | <0.02 | 0.09 | 0.06 | 0.18 | 0.22 | 0.14 | 0.62 |
|  |  | reduction rate (%) | 20.59 | 98.10 | 91.00 | 93.94 | 82.00 | 76.84 | 85.26 | 45.13 |
| filtrate | 45 ppm | concentration (ppm) | 0.88 | <0.02 | 0.06 | <0.05 | 0.09 | 0.04 | 0.06 | 0.80 |
|  |  | reduction rate (%) | 13.73 | 98.10 | 94.00 | 94.95 | 91.00 | 95.79 | 93.68 | 29.20 |
| filtrate | 90 ppm | concentration (ppm) | 0.82 | <0.02 | 0.08 | <0.05 | 0.11 | 0.03 | <0.02 | 0.56 |
|  |  | reduction rate (%) | 19.61 | 98.10 | 92.00 | 94.95 | 89.00 | 96.84 | 97.89 | 50.44 |

From the results of above tables, it can be seen that after filtration, the reductions rates are higher than those before filtration and when there were $Ca^{2+}$ in the solution, the reduction rates are significantly higher than those where there were not $Ca^{2+}$ in the solution.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A polymer derived from:

reaction of glycidyl (meth)acrylate, allyl glycidyl ether or [(vinyloxy)methyl]oxirane with ammonia or primary amine to obtain a mixture of monomer compounds, wherein the primary amine is iso-propanolamine, propanolamine or monoethanol amine;

reaction of the mixture of monomer compounds with at least one of acrylic acid, vinyl alcohol, vinyl acetate, acrylamide, methylacrylic acid, and methylacrylamide to obtain an intermediate polymer; and reaction of the intermediate polymer with carbon disulfide and sodium hydroxide.

2. A polymer derived from:

reaction of glycidyl (meth)acrylate, allyl glycidyl ether or [(vinyloxy)methyl]oxirane with ammonia or primary amine to obtain a mixture of monomer compounds;

reaction of the mixture of monomer compounds with at least one of acrylic acid, vinyl alcohol, vinyl acetate, acrylamide, methylacrylic acid, and methylacrylamide to obtain an intermediate polymer; and reaction of the intermediate polymer with carbon disulfide and sodium hydroxide, wherein the mixture of monomer compounds comprises at least one of compounds 1, 3 and 5, and at least one of compounds 2, 4, and 6

1

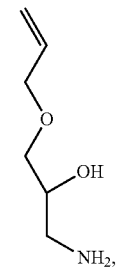

2

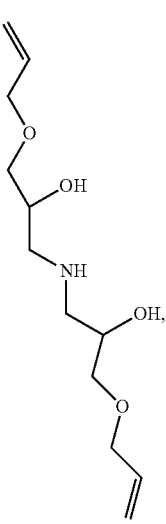

3

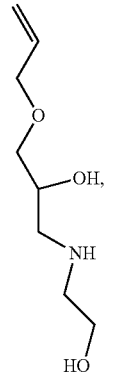

4

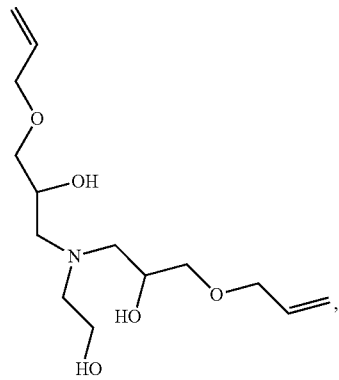

5

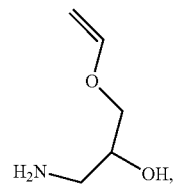

6

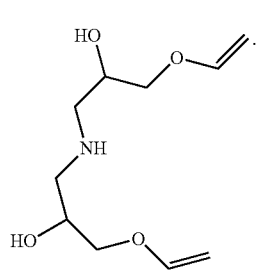

3. The polymer of claim 2, wherein the primary amine is iso-propanolamine, propanolamine, or monoethanol amine.

4. A method comprising:

adding an effective amount of a polymer of claim 1 to an aqueous solution comprising at least one element selected from the group consisting of aluminium, arsenic, beryllium, bismuth, cadmium, cobalt, chromium, copper, iron, mercury, manganese, molybdenum, nickel, lead, plutonium, tin, thorium, thallium, uranium, vanadium, tungsten, zirconium, zinc, selenium and combinations thereof to form a precipitate comprising the at least one element; and removing the precipitate from the aqueous solution.

5. The method of claim 4, wherein the polymer comprises structural unit of formula A, structural unit of formula B, and, structural unit of formula C or structural unit of formula D

A

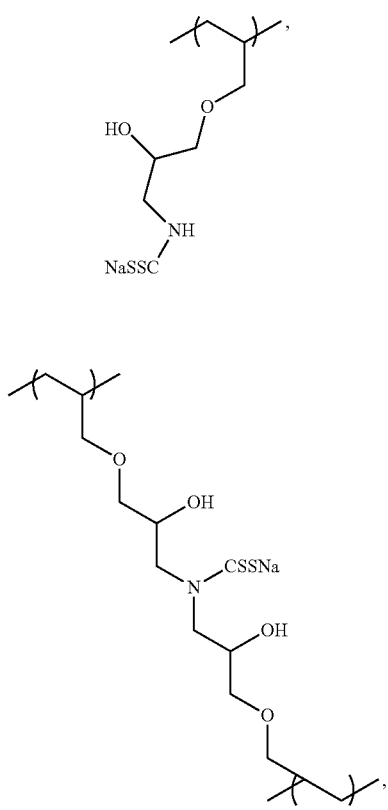

B

C

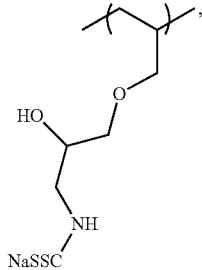

D

6. The method of claim 4, wherein the polymer comprises structural unit of formula E, structural unit of formula F, and, structural unit of formula C or structural unit of formula D

E

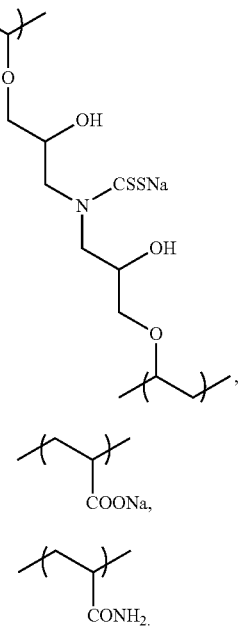

F

C

D

7. The method of claim 4, wherein the polymer comprises structural unit of formula C, at least one of structural unit of formula H and structural unit of formula I, and, at least one of structural unit of formula J and structural unit of formula K

C

H

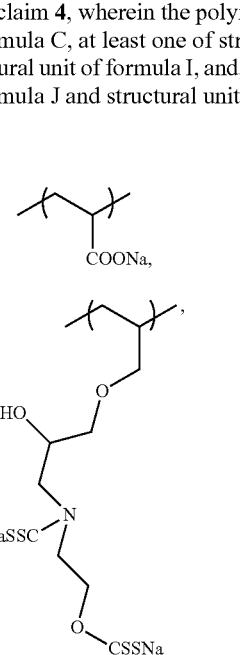

I

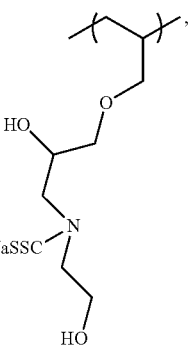

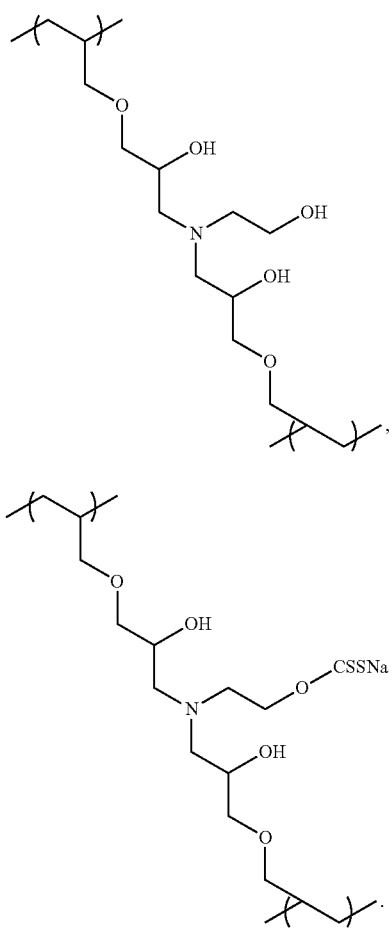

8. The method of claim 4, wherein a concentration ratio by weight of each of the at least one element to the polymer in the aqueous solution ranges from about 100:1 to about 1:1000.

9. The method of claim 4, wherein the at least one element is selected from the group consisting of mercury, chromium, copper, zinc, lead, cobalt, cadmium, nickel and combinations thereof.

10. The method of claim 4, wherein the polymer comprises structural units of formula I, formula II, and formula III

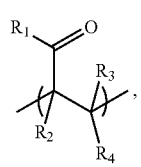

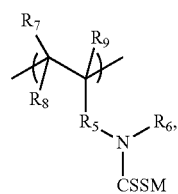

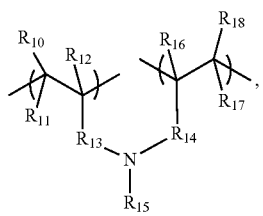

wherein $R_1$ is —OM or —$NH_2$;

$R_2$, $R_9$, $R_{12}$, and $R_{16}$ are independently hydrogen, or a methyl group;

$R_3$, $R_4$, $R_7$, $R_8$, $R_{10}$, $R_{11}$, $R_{17}$, and $R_{18}$ are independently hydrogen, a methyl group, or —COOH, only one of $R_3$ and $R_4$, or $R_7$ and $R_8$, or $R_{10}$ and $R_{11}$, or $R_{17}$ and $R_{18}$ is —COOH;

$R_5$, $R_{13}$, and $R_{14}$ are independently

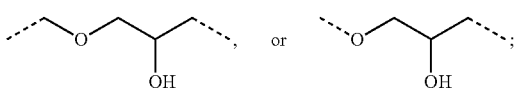

$R_6$ is H,

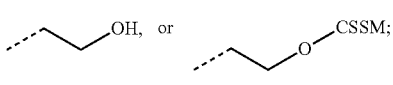

$R_{15}$ is —CSSM,

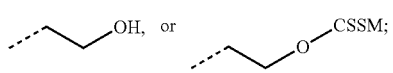

and

M is monovalent cation.

11. The method of claim 10, wherein the polymer comprises from about 0.1 mol % to about 40 mol % of structural units of formula III based on a total of structural units of formula I, II and III.

12. The method of claim 10, wherein the polymer comprises from about 1 mol % to about 10 mol % of structural units of formula III based on a total of structural units of formula I, II and III.

13. The method of claim 4, wherein the removing is by filtering the precipitate from the aqueous solution.

14. The method of claim 4, wherein the aqueous solution comprises calcium ions or magnesium ions.

15. The method of claim 4, wherein a pH of the aqueous solution is at least about 7.

16. A polymer comprising structural units of formula I, formula II, and formula III

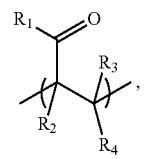

I

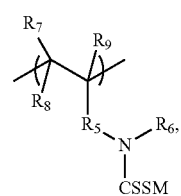

II

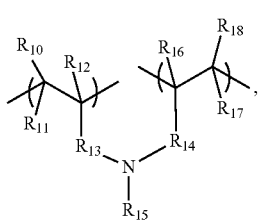

III wherein $R_1$ is —OM or —NH$_2$;

$R_2$, $R_9$, $R_{12}$, and $R_{16}$ are independently hydrogen, or a methyl group;

$R_3$, $R_4$, $R_7$, $R_8$, $R_{10}$, $R_{11}$, $R_{17}$, and $R_{18}$ are independently hydrogen, a methyl group, or —COOH, only one of $R_3$ and $R_4$, or $R_7$ and $R_8$, or $R_{10}$ and $R_{11}$, or $R_{17}$ and $R_{18}$ is —COOH;

$R_5$, $R_{13}$, and $R_{14}$ are independently

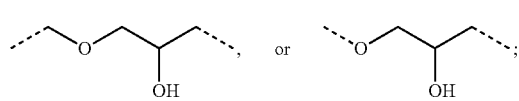

$R_6$ is H,

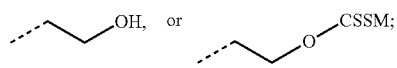

$R_{15}$ is —CSSM,

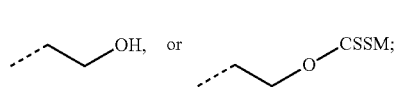

and

M is monovalent cation.

17. The polymer of claim 16, wherein the polymer comprises structural units of formula A, formula B, and, formula C or formula D

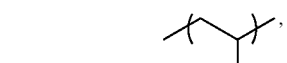

A

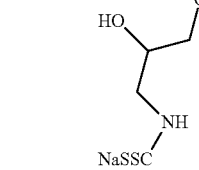

B

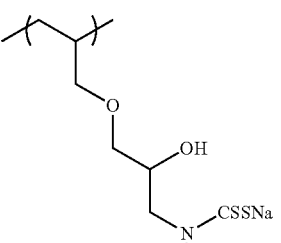

C

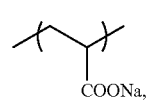

D

18. The polymer of claim 16, wherein the polymer comprises structural units of formula E, formula F, and, formula C or formula D

E

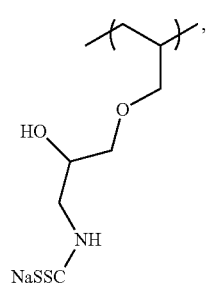

-continued
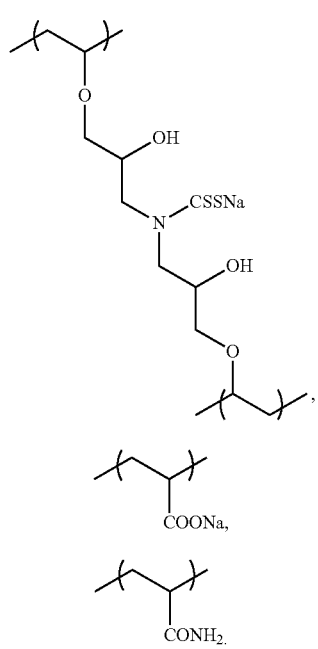
F
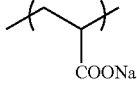
C
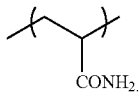
D
19. The polymer of claim 16, wherein the polymer comprises structural unit of formula C, at least one of structural unit of formula H and structural unit of formula I, and at least one of structural units of formula J and structural units of formula K
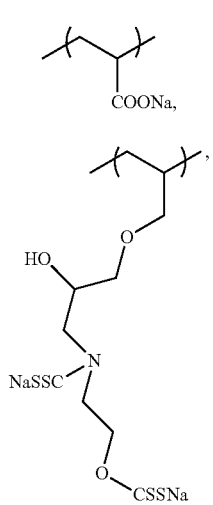
C
H
-continued
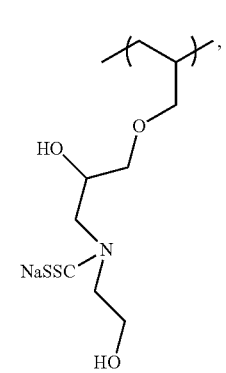
I
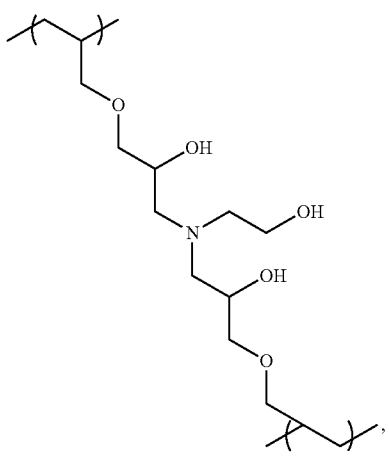
J
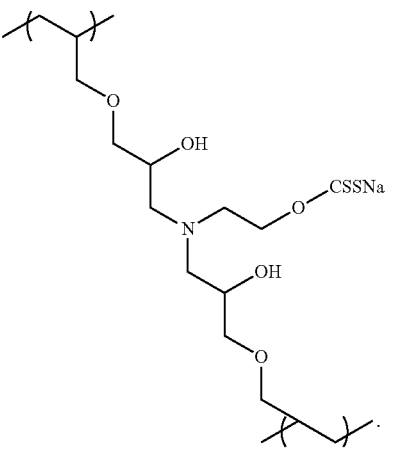
K
* * * * *